United States Patent [19]

Lawson

[11] Patent Number: 5,702,607

[45] Date of Patent: Dec. 30, 1997

[54] ON-SITE AUTOMATED CLOSED LOOP PETROLEUM BASED HYDROCARBON FLUID FILTRATION AND RECYCLING SYSTEM

[76] Inventor: David M. Lawson, 16 Chatham Ct., San Jose, Calif. 95139

[21] Appl. No.: 676,983

[22] Filed: Jul. 8, 1996

[51] Int. Cl.[6] .................... B01D 15/00; B01D 37/00
[52] U.S. Cl. .................... 210/663; 210/805; 210/806; 210/138; 210/167; 210/342; 210/416.1; 210/489; 210/502.1; 210/917; 210/283; 134/40; 134/111; 134/169 A
[58] Field of Search ..................... 210/663, 805, 210/806, 138, 167, 283, 323.1, 342, 416.1, 416.5, 483, 484, 488, 489, 502.1, 917; 134/40, 24, 111, 169 A, 172

[56] References Cited

U.S. PATENT DOCUMENTS

| 3,707,404 | 12/1972 | Carlson et al. | 134/10 |
|---|---|---|---|
| 5,107,876 | 4/1992 | Ozyjiwsky | 134/111 |
| 5,298,162 | 3/1994 | Niederer et al. | 210/418 |
| 5,349,974 | 9/1994 | Mansur | 134/111 |
| 5,368,653 | 11/1994 | Russell | 134/24 |

*Primary Examiner*—Robert Popovics
*Attorney, Agent, or Firm*—Richard L. Miller, P.E.

[57] ABSTRACT

An on-site automated closed loop petroleum based hydrocarbon fluid filtration and recycling system that continuously recycles a spent petroleum based hydrocarbon fluid and simultaneously continuously dispenses the recycled petroleum based hydrocarbon fluid. The system includes a hollow and open-top fluid reservoir, a lid that selectively opens and closes the hollow and open-top fluid reservoir, inlet apparatus that inputs the spent petroleum based hydrocarbon fluid into the hollow and open-top fluid reservoir, outlet apparatus that outputs the recycled petroleum based hydrocarbon fluid from the hollow and open-top fluid reservoir, a first filtering stage that removes large particles of dirt and grease from the spent petroleum based hydrocarbon fluid passing therethrough, a second filtering stage that removes small particles of dirt and grease from the spent petroleum based hydrocarbon fluid passing therethrough, a submersible internal pump that draws in the spent petroleum based hydrocarbon fluid passing through the second filtering stage, a third filtering stage that adsorbs grease and dirt from the spent petroleum based hydrocarbon fluid passing therethrough, a fourth filtering stage that removes discoloration from the spent petroleum based hydrocarbon fluid passing therethrough.

31 Claims, 2 Drawing Sheets

FIG. 1

ON-SITE AUTOMATED CLOSED LOOP PETROLEUM BASED HYDROCARBON FLUID FILTRATION AND RECYCLING SYSTEM

BACKGROUND OF THE INVENTION

The present invention relates to an on-site automated closed loop petroleum based hydrocarbon fluid filtration and recycling system. More particularly, the present invention relates to an on-site automated closed loop petroleum based hydrocarbon fluid filtration and recycling system that includes a hollow and open-top fluid reservoir, a lid that selectively opens and closes the hollow and open-top fluid reservoir, inlet apparatus that inputs the spent petroleum based hydrocarbon fluid into the hollow and open-top fluid reservoir, outlet apparatus that outputs the recycled petroleum based hydrocarbon fluid from the hollow and open-top fluid reservoir, a first filtering stage that removes large particles of dirt and grease from the spent petroleum based hydrocarbon fluid passing therethrough, a second filtering stage that removes small particles of dirt and grease from the spent petroleum based hydrocarbon fluid passing therethrough, a submersible internal pump that draws in the spent petroleum based hydrocarbon fluid passing through the second filtering stage, a third filtering stage that adsorbs grease and dirt from the spent petroleum based hydrocarbon fluid passing therethrough, a fourth filtering stage that removes discoloration from the spent petroleum based hydrocarbon fluid passing therethrough.

During maintenance, repair, and rebuilding operations in virtually all industrial and commercial environments, it is necessary to wash a wide variety of parts and articles in order to remove grease, oil, dirt, and other contaminants. Typically, volatile solvents are used in almost all small parts cleaning operations as they have been found to be most effective in removing grease and other accumulated residue from metal parts and other articles.

In order to facilitate washing of various parts with a volatile solvent, such as hydrocarbon or halogenated hydrocarbon, there is presently available a sink which is removably supported on top of a 55 gallon drum filled with cleaning solvent. A pump is provided which pumps the solvent from the drum to a spicket in the sink where it is used to rinse parts. From the sink, the solvent is drained back into the drum.

During washing operations, the solvent becomes immediately contaminated after the first use. The contaminated solvent, however, is continuously used during cleaning operations until a next scheduled solvent replacement, which is usually on a monthly basis.

The regular replacement of contaminated solvent is ordinarily provided by a service, which also supplies the washing apparatus, on a service contract basis to replace the solvent, the sink is removed from the drum containing the contaminated solvent and is placed on another containing fresh solvent. The contaminated drum of solvent must then be taken away and disposed of in a manner complying with EPA contaminant disposal guidelines.

This procedure is inefficient, costly, and time consuming, leaving a busy manufacturing or repair facility with no other alternative than to perform parts cleaning operation using dirty, contaminated solvent between scheduled solvent replacement dates.

Numerous innovations for parts washers and solvent recycling have been provided in the prior art that will be described. Even though these innovations may be suitable for the specific individual purposes to which they address, however, they differ from the present invention in that they do not teach an on-site automated closed loop petroleum based hydrocarbon fluid filtration and recycling system that includes a hollow and open-top fluid reservoir, a lid that selectively opens and closes the hollow and open-top fluid reservoir, inlet apparatus that inputs the spent petroleum based hydrocarbon fluid into the hollow and open-top fluid reservoir, outlet apparatus that outputs the recycled petroleum based hydrocarbon fluid from the hollow and open-top fluid reservoir, a first filtering stage that removes large particles of dirt and grease from the spent petroleum based hydrocarbon fluid passing therethrough, a second filtering stage that removes small particles of dirt and grease from the spent petroleum based hydrocarbon fluid passing therethrough, a submersible internal pump that draws in the spent petroleum based hydrocarbon fluid passing through the second filtering stage, a third filtering stage that adsorbs grease and dirt from the spent petroleum based hydrocarbon fluid passing therethrough, a fourth filtering stage that removes discoloration from the spent petroleum based hydrocarbon fluid passing therethrough.

FOR EXAMPLE, U.S. Pat. No. 3,707,404 to Carlson et al. teaches a parts washer that includes a parts washing basin supported by a tank which is partially filled with water and partially with parts washing solvent floating above the water. The drain from the basin extends to the bottom of the tank. A pump immersed in the solvent supplies solvent to a nozzle for washing the parts. Solvent collected by the drain forms a column sufficiently tall to force solvent to the bottom of the drain to bubble upwardly through the water, substantially cleaning it of foreign matter washed from the parts by the solvent.

ANOTHER EXAMPLE, U.S. Pat. No. 5,107,876 to Ozyjiwsky teaches a parts washer that includes storage means disposed below a basin that is separated to provide a lowermost sludge collecting part. Recirculation of solvent is drawn from only an upper part of the underneath storage means to minimize sludge disturbance. Two separate chambers have a conduit extending from the basin and directly feeding draining solvent into a lowermost of the chambers. Excess solvent is directed through a second conduit directing solvent through a filter and then into an upper level of the upper chamber. The recirculating pump with its inlet is located in its upper chamber. The lowermost chamber is adapted to be removable for sludge removal and solvent replacement.

STILL ANOTHER EXAMPLE, U.S. Pat. No. 5,298,162 to Niederer et al. teaches a multi-stage fluid filter that filters entrained particulate matter from a moving fluid stream at substantially constant fluid pressure and filtration efficiency during continuous on-line operation. The filter includes a housing having a fluid inlet and a fluid outlet, first and second stationary filtration elements positioned in the housing, each having a filtration medium therein from an upstream side to a downstream side thereof. The two elements are positioned in series for fluid flow from the downstream side of one of the two elements defined as a first filter stage for accumulating particulate matter on the filtration medium thereof to the upstream side of the other of the two elements defined as a second filter stage having a previously accumulated layer of particulate matter on the filtration medium thereof. A structure is provided for selectably alternating the first and second filter elements to the first and second stage positions to, after cleaning particulate matter from the filter medium in the cleaning stage and upon an increase in resistance to fluid flow through the second filter stage caused by an increase in thickness and/or density in the layer of particulate matter, redefine the one of the filter elements as the first filter stage and the other of the filter elements as the second filter stage successively to permit the filter to operate continuously after a filter layer is accumulated on the filter medium in the first filter stage. YET ANOTHER EXAMPLE, U.S. Pat. No. 5,349,974 to Mansur teaches an apparatus for washing automotive, aviation, marine and general parts with a volatile solvent during maintenance, repair and rebuilding operations. The apparatus includes a wash basin with a drain to facilitate return of the solvent to a holding tank having a pump therein for recirculating the solvent back to the wash basin through a discharge spout for washing parts. A first valve assembly between the drain and holding tank closes during periods of non-use to prevent vapors from escaping to the atmosphere. During a timed recycling process, a second valve assembly releases used and contaminated solvent from the holding tank into a distillation pot where the solvent is heated under vacuum to produce vapors. The vapors pass through a condenser where they are cooled to a liquid state, yielding pure solvent, which is directed into the holding tank for future parts washing as demanded.

FINALLY, STILL YET ANOTHER EXAMPLE, U.S. Pat. No. 5,368,653 to Russell teaches a parts washer for cleaning mechanical parts with a liquid cleaning solvent that includes a sink mounted upon a reservoir. The sink has a bottom wall in which a filter cartridge opening is defined for removably receiving a filter cartridge depending downwardly toward the reservoir and mounted upon the bottom wall. A pump draws liquid cleaning solvent from the reservoir and circulates the liquid cleaning solvent into the sink and back into the reservoir. A hose mounted in sink may be connected directly to the filter cartridge. The pump assembly is operated so that liquid cleaning solvent is circulated directly, under pressure, into the filter cartridge for clarifying and reclaiming the liquid cleaning solvent in order to maintain its cleaning efficiency and prolong its service life.

It is apparent that numerous innovations for parts washers and solvent recycling have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide an automated closed loop petroleum based hydrocarbon fluid filtration and recycling system that avoids the disadvantages of the prior art.

ANOTHER OBJECT of the present invention is to provide an automated closed loop petroleum based hydrocarbon fluid filtration and recycling system that is simple and inexpensive to manufacture.

STILL ANOTHER OBJECT of the present invention is to provide an automated closed loop petroleum based hydrocarbon fluid filtration and recycling system that is simple to use.

YET ANOTHER OBJECT of the present invention is to provide an automated closed loop petroleum based hydrocarbon fluid filtration and recycling system that is a close-looped container which offers clean petroleum based hydrocarbon fluids forever.

STILL YET ANOTHER OBJECT of the present invention is to provide an automated closed loop petroleum based hydrocarbon fluid filtration and recycling system that offers many advantages to various industries currently forced to dispose of dirty oil soiled solvent, jeopardizing the environment.

YET STILL ANOTHER OBJECT of the present invention is to provide an automated closed loop petroleum based hydrocarbon fluid filtration and recycling system that automatically recycles dirty petroleum based hydrocarbon fluids and thereby eliminating the need to dispose thereof which adds the unnecessary generating and transporting of hazardous wastes.

STILL YET ANOTHER OBJECT of the present invention is to provide an automated closed loop petroleum based hydrocarbon fluid filtration and recycling system that can be put on a mobile unit to easily pick up and recycle dirty soiled petroleum based hydrocarbon fluids which could be stored in numerous locations on job sites.

YET STILL ANOTHER OBJECT of the present invention is to provide an automated closed loop petroleum based hydrocarbon fluid filtration and recycling system that allows extended use of some petroleum based hydrocarbon fluids without having to dispose thereof.

STILL YET ANOTHER OBJECT of the present invention is to provide an automated closed loop petroleum based hydrocarbon fluid filtration and recycling system that can be a stationary unit.

YET STILL ANOTHER OBJECT of the present invention is to provide an automated closed loop petroleum based hydrocarbon fluid filtration and recycling system that allows an economically sound solution for preventing tomorrow's pollution.

STILL YET ANOTHER OBJECT of the present invention is to provide an automated closed loop petroleum based hydrocarbon fluid filtration and recycling system that recycles the petroleum based hydrocarbon fluid while the user is using their parts washer and thus results in an automatic recycling process.

BRIEFLY STATED, YET STILL ANOTHER OBJECT of the present invention is to provide an on-site automated closed loop petroleum based hydrocarbon fluid filtration and recycling system having an operating time and continuously recycling a spent petroleum based hydrocarbon fluid having a time of use and simultaneously continuously dispensing a recycled petroleum based hydrocarbon fluid which is the spent petroleum based hydrocarbon fluid after being recycled, that includes a hollow and open-top fluid reservoir, a lid, inlet apparatus, outlet apparatus, a first filtering stage, a second filtering stage, a submersible internal pump, a third filtering stage, connecting apparatus, and a fourth filtering stage.

STILL YET ANOTHER OBJECT of the present invention is to provide an automated closed loop petroleum based hydrocarbon fluid filtration and recycling system wherein the hollow and open-top fluid reservoir has a closed bottom with an inner surface, and an open top disposed above the closed bottom of the hollow and open-top fluid reservoir.

YET STILL ANOTHER OBJECT of the present invention is to provide an automated closed loop petroleum based hydrocarbon fluid filtration and recycling system wherein the lid has an outer surface, an inner surface, an inlet throughport extending vertically therethrough, an output throughport extending vertically therethrough, and selectively opening and closing the open top of the hollow and open-top fluid reservoir, so that internal components housed in the hollow and open-top fluid reservoir can be readily serviced.

STILL YET ANOTHER OBJECT of the present invention is to provide an automated closed loop petroleum based hydrocarbon fluid filtration and recycling system wherein the inlet apparatus inputs the spent petroleum based hydrocarbon fluid into the hollow and open-top fluid reservoir.

YET STILL ANOTHER OBJECT of the present invention is to provide an automated closed loop petroleum based hydrocarbon fluid filtration and recycling system wherein the inlet apparatus is disposed in the inlet throughport in the lid.

STILL YET ANOTHER OBJECT of the present invention is to provide an automated closed loop petroleum based hydrocarbon fluid filtration and recycling system wherein the outlet apparatus outputs the recycled petroleum based hydrocarbon fluid from the hollow and open-top fluid reservoir.

YET STILL ANOTHER OBJECT of the present invention is to provide an automated closed loop petroleum based hydrocarbon fluid filtration and recycling system wherein the outlet apparatus is disposed in the outlet throughport in the lid.

STILL YET ANOTHER OBJECT of the present invention is to provide an automated closed loop petroleum based hydrocarbon fluid filtration and recycling system wherein the first filtering stage is contained in the hollow and open-top fluid reservoir and is removably attached to the inlet apparatus.

YET STILL ANOTHER OBJECT of the present invention is to provide an automated closed loop petroleum based hydrocarbon fluid filtration and recycling system wherein the first filtering stage removes large particles of dirt and grease from the spent petroleum based hydrocarbon fluid passing therethrough.

STILL YET ANOTHER OBJECT of the present invention is to provide an automated closed loop petroleum based hydrocarbon fluid filtration and recycling system wherein the second filtering stage encases the first filtering stage and is contained in the hollow and open-top fluid reservoir.

YET STILL ANOTHER OBJECT of the present invention is to provide an automated closed loop petroleum based hydrocarbon fluid filtration and recycling system wherein the second filtering station is removably attached to the inlet apparatus and removes small particles of dirt and grease from the spent petroleum based hydrocarbon fluid passing therethrough.

STILL YET ANOTHER OBJECT of the present invention is to provide an automated closed loop petroleum based hydrocarbon fluid filtration and recycling system wherein the submersible internal pump has an operating time and is disposed in the hollow and open-top fluid reservoir on the inner surface of the closed bottom of the hollow and open-top fluid reservoir, in proximity to the outlet apparatus.

YET STILL ANOTHER OBJECT of the present invention is to provide an automated closed loop petroleum based hydrocarbon fluid filtration and recycling system wherein the submersible internal pump draws in the spent petroleum based hydrocarbon fluid passing through the second filtering stage.

STILL YET ANOTHER OBJECT of the present invention is to provide an automated closed loop petroleum based hydrocarbon fluid filtration and recycling system wherein the third filtering stage is contained in the hollow and open-top fluid reservoir and is tandemly disposed to the first filtering stage and the second filtering stage.

YET STILL ANOTHER OBJECT of the present invention is to provide an automated closed loop petroleum based hydrocarbon fluid filtration and recycling system wherein the third filtering stage adsorbs grease and dirt from the spent petroleum based hydrocarbon fluid passing therethrough.

STILL YET ANOTHER OBJECT of the present invention is to provide an automated closed loop petroleum based hydrocarbon fluid filtration and recycling system wherein the connecting apparatus fluidly connects the submersible internal pump to the third filtering stage and is contained in the hollow and open-top fluid reservoir.

YET STILL ANOTHER OBJECT of the present invention is to provide an automated closed loop petroleum based hydrocarbon fluid filtration and recycling system wherein the connecting apparatus transports the spent petroleum based hydrocarbon fluid drawn in by the submersible internal pump to the third filtering stage.

STILL YET ANOTHER OBJECT of the present invention is to provide an automated closed loop petroleum based hydrocarbon fluid filtration and recycling system wherein the fourth filtering stage encases the third filtering stage and is contained in the hollow and open-top fluid reservoir.

YET STILL ANOTHER OBJECT of the present invention is to provide an automated closed loop petroleum based hydrocarbon fluid filtration and recycling system wherein the fourth filtering station removes discoloration from the spent petroleum based hydrocarbon fluid passing therethrough, so that the spent petroleum based hydrocarbon fluid passes downwardly through the first filtering stage and is purged of large particles of dirt and grease, then passes downwardly through the second filtering stage and is purged of small particles of dirt and grease, then is drawn into the submersible internal pump, then is pumped upwardly through the connecting apparatus, then passes downwardly through the third filtering stage and is purged of dirt and grease, then passes downwardly through the fourth filtering stage and is purged of discolorations, then enters into the hollow and open-top fluid reservoir, and then enters into the outlet apparatus as the recycled petroleum based hydrocarbon fluid.

STILL YET ANOTHER OBJECT of the present invention is to provide an automated closed loop petroleum based hydrocarbon fluid filtration and recycling system wherein the hollow and open-top fluid reservoir is a 55 gallon circular-cylindrically-shaped and open-top drum and the lid is a circular-shaped lid so as to be compatible with the 55 gallon circular-cylindrically-shaped open-top drum.

YET STILL ANOTHER OBJECT of the present invention is to provide an automated closed loop petroleum based hydrocarbon fluid filtration and recycling system wherein the outlet apparatus is a conduit that passes sealing through the outlet throughport in the lid and terminates at a free end thereof in the hollow and open-top fluid reservoir slightly above the inner surface of the closed bottom of the hollow and open-top fluid reservoir.

STILL YET ANOTHER OBJECT of the present invention is to provide an automated closed loop petroleum based hydrocarbon fluid filtration and recycling system wherein the lid further has a pair of spaced-apart canister mounting throughbores that extend vertically therethrough, and a power line throughbore that extends vertically therethrough.

YET STILL ANOTHER OBJECT of the present invention is to provide an automated closed loop petroleum based hydrocarbon fluid filtration and recycling system wherein the submersible internal pump is selected from the group consisting of electric and hydraulic.

STILL YET ANOTHER OBJECT of the present invention is to provide an automated closed loop petroleum based hydrocarbon fluid filtration and recycling system that further includes an external timer that is disposed externally to the hollow and open-top fluid reservoir.

YET STILL ANOTHER OBJECT of the present invention is to provide an automated closed loop petroleum based hydrocarbon fluid filtration and recycling system wherein the external timer is in communication with the submersible internal pump through a conduit that extends from the external timer, sealingly through the power line throughbore in the lid, and to the submersible internal pump, so that the operating time of the submersible internal pump and thereby the operating time of the on-site automated closed loop petroleum based hydrocarbon fluid filtration and recycling system can be controlled.

STILL YET ANOTHER OBJECT of the present invention is to provide an automated closed loop petroleum based hydrocarbon fluid filtration and recycling system wherein the operating time of the on-site automated closed loop petroleum based hydrocarbon fluid filtration and recycling system is approximately twice the time of use of the spent petroleum based hydrocarbon fluid to be recycled.

YET STILL ANOTHER OBJECT of the present invention is to provide an automated closed loop petroleum based hydrocarbon fluid filtration and recycling system wherein the inlet apparatus includes an external fitting that has a hollow, cylindrically-shaped, and wide lower portion that sealingly passes vertically downwardly into the inlet throughport in the lid slightly past the inner surface of the lid, and a hollow, cylindrically-shaped, and narrow upper portion that is collinear with, in fluid communication with, and narrower than, the hollow, cylindrically-shaped, and wide lower portion of the external fitting of the inlet apparatus.

STILL YET ANOTHER OBJECT of the present invention is to provide an automated closed loop petroleum based hydrocarbon fluid filtration and recycling system wherein the hollow, cylindrically-shaped, and narrow upper portion of the inlet apparatus extends vertically upwardly slightly past the outer surface of the lid.

YET STILL ANOTHER OBJECT of the present invention is to provide an automated closed loop petroleum based hydrocarbon fluid filtration and recycling system wherein the inlet apparatus further includes an internal fitting that has a hollow and cylindrically-shaped portion with a circumferentially-disposed and radially-outwardly-extending flange that extends circumferentially around, and radially outwardly from, a lower end thereof.

STILL YET ANOTHER OBJECT of the present invention is to provide an automated closed loop petroleum based hydrocarbon fluid filtration and recycling system wherein the hollow and cylindrically-shaped portion of the internal fitting of the inlet apparatus sealingly passes vertically upwardly into the inlet throughport in the lid, with the circumferentially-disposed and radially-outwardly-extending flange of the lower end of the hollow and cylindrically-shaped portion of the internal fitting of the inlet apparatus disposed below the lid.

YET STILL ANOTHER OBJECT of the present invention is to provide an automated closed loop petroleum based hydrocarbon fluid filtration and recycling system wherein the hollow and cylindrically-shaped portion of the internal fitting of the inlet apparatus snugly engages, and is in fluid communication with, the hollow, cylindrically-shaped, and wide lower portion of the external fitting of the inlet apparatus, with the lid being engaged therebetween.

STILL YET ANOTHER OBJECT of the present invention is to provide an automated closed loop petroleum based hydrocarbon fluid filtration and recycling system wherein the first filtering stage is an empty porous polyester draw bag that is removably secured, by a draw string, around the hollow and cylindrically-shaped portion of the internal fitting of the inlet apparatus and extends vertically downwardly therefrom, with the circumferentially-disposed and radially-outwardly-extending flange of the lower end of the hollow and cylindrically-shaped portion of the internal fitting of the inlet apparatus providing a seal therebetween against leaks, while the draw string of the empty porous polyester draw bag of the first filtering stage allows for quick and easy replacement thereof.

YET STILL ANOTHER OBJECT of the present invention is to provide an automated closed loop petroleum based hydrocarbon fluid filtration and recycling system wherein the empty porous polyester draw bag of the first filtering stage is 4" in diameter, 12" in length, and has a porosity in the range of 100–200 microns when the spent petroleum based hydrocarbon fluid is a cleaning solvent, and has a porosity in the range of 50–100 when the spent petroleum based hydrocarbon fluid is a blanket wash.

STILL YET ANOTHER OBJECT of the present invention is to provide an automated closed loop petroleum based hydrocarbon fluid filtration and recycling system wherein the porosity of the empty porous polyester draw bag of the first filtering stage is 200 microns when the spent petroleum based hydrocarbon fluid is a cleaning solvent, and is 50 microns when the spent petroleum based hydrocarbon fluid is a blanket wash.

YET STILL ANOTHER OBJECT of the present invention is to provide an auto.hated closed loop petroleum based hydrocarbon fluid filtration and recycling system wherein the second filtering stage is an empty porous polyester draw bag that encases the empty porous polyester draw bag of the first filtering stage.

STILL YET ANOTHER OBJECT of the present invention is to provide an automated closed loop petroleum based hydrocarbon fluid filtration and recycling system wherein the empty porous polyester draw bag of the second filtering stage is removably secured, by a draw string, around the hollow and cylindrically-shaped portion of the internal fitting of the inlet apparatus and extends vertically downwardly therefrom, with the circumferentially-disposed and radially-outwardly-extending flange of the lower end of the hollow and cylindrically-shaped portion of the internal fitting of the inlet apparatus providing a seal therebetween against leaks, while the draw string of the empty porous polyester draw bag of the second filtering stage allows for quick and easy replacement thereof.

YET STILL ANOTHER OBJECT of the present invention is to provide an automated closed loop petroleum based hydrocarbon fluid filtration and recycling system wherein the empty porous polyester draw bag of the second filtering stage is 6" in diameter, 18" in length, and has a porosity in the range of 1–100 microns when the spent petroleum based hydrocarbon fluid is a cleaning solvent, and has a porosity in the range of 1–50 microns when the spent petroleum based hydrocarbon fluid is a blanket wash.

STILL YET ANOTHER OBJECT of the present invention is to provide an automated closed loop petroleum based hydrocarbon fluid filtration and recycling system wherein the porosity of the empty porous polyester draw bag of the second filtering stage is 100 microns when the spent petroleum based hydrocarbon fluid is a cleaning solvent, and has a porosity of 5 microns when the spent petroleum based hydrocarbon fluid is a blanket wash.

YET STILL ANOTHER OBJECT of the present invention is to provide an automated closed loop petroleum based hydrocarbon fluid filtration and recycling system that further includes a hollow canister that contains the third filtering stage and the fourth filtering stage.

STILL YET ANOTHER OBJECT of the present invention is to provide an automated closed loop petroleum based hydrocarbon fluid filtration and recycling system wherein the hollow canister is disposed in the hollow and open-top fluid reservoir in tandem to the first filtering stage and the second filtering stage and has a circular-cylindrically-shaped top cap with a circular-shaped closed top that has an outer surface and an inner surface with a center.

YET STILL ANOTHER OBJECT of the present invention is to provide an automated closed loop petroleum based hydrocarbon fluid filtration and recycling system wherein the circular-cylindrically-shaped top cap of the hollow canister further has an open bottom, and a hollow and cylindrically-shaped side with a throughbore extending horizontally therethrough.

STILL YET ANOTHER OBJECT of the present invention is to provide an automated closed loop petroleum based hydrocarbon fluid filtration and recycling system wherein the circular-cylindrically-shaped top cap of the hollow canister further has a pair of spaced-apart and threaded canister mounting rods that have vertical axes and extend vertically upwardly from the outer surface of the circular-shaped closed top of the circular-cylindrically-shaped top cap of the hollow canister, from a diameter thereof.

YET STILL ANOTHER OBJECT of the present invention is to provide an automated closed loop petroleum based hydrocarbon fluid filtration and recycling system wherein the pair of spaced-apart and threaded canister mounting rods of the diameter of the outer surface of the circular-shaped closed top of the circular-cylindrically-shaped top cap of the hollow canister pass through the pair of spaced-apart canister mounting throughbores in the lid and threadably engage canister mounting nuts, with the outer surface of the circular-shaped closed top of the circular-cylindrically-shaped top cap of the hollow canister abutting against the inner surface of the lid.

STILL YET ANOTHER OBJECT of the present invention is to provide an automated closed loop petroleum based hydrocarbon fluid filtration and recycling system wherein the circular-cylindrically-shaped top cap of the hollow canister further has a hollow and cylindrically-shaped portion that extends vertically downwardly from the center of the inner surface of the circular-shaped closed top of the circular-cylindrically-shaped top cap of the hollow canister, in a position equidistantly between the vertical axes of the pair of spaced-apart and threaded canister mounting rods of the diameter of the outer surface of the circular-shaped closed top of the circular-cylindrically-shaped top cap of the hollow canister.

YET STILL ANOTHER OBJECT of the present invention is to provide an automated closed loop petroleum based hydrocarbon fluid filtration and recycling system wherein the hollow and cylindrically-shaped portion of the center of the inner surface of the circular-cylindrically-shaped top cap of the hollow canister has a circumferentially-disposed and radially-outwardly-extending flange that extends circumferentially around, and STILL YET ANOTHER OBJECT of the present invention is to provide an automated closed loop petroleum based hydrocarbon fluid filtration and recycling system wherein the hollow and cylindrically-shaped portion of the center of the inner surface of the circular-cylindrically-shaped top cap of the hollow canister further has a horizontally-outwardly extending inlet tube that extends horizontally outwardly therefrom and is in fluid communication therewith.

YET STILL ANOTHER OBJECT of the present invention is to provide an automated closed loop petroleum based hydrocarbon fluid filtration and recycling system wherein the connecting apparatus includes a substantially Z-shaped conduit that has a lower end that is connected to, and in fluid communication with, the submersible internal pump, and an upper end that passes through the throughbore in the hollow and cylindrically-shaped side of the circular-cylindrically-shaped top cap of the hollow canister, and is sealingly connected to, and in fluid communication with, the horizontally-outwardly extending inlet tube of the hollow and cylindrically-shaped portion of the center of the inner surface of the closed top of the circular-cylindrically-shaped top cap of the hollow canister, so that the submersible internal pump is in fluid communication with the hollow canister.

STILL YET ANOTHER OBJECT of the present invention is to provide an automated closed loop petroleum based hydrocarbon fluid filtration and recycling system wherein the hollow canister further includes a hollow, open-ended, and circular-cylindrically-shaped body that extends vertically downwardly from, in fluid communication with, and is replaceably sealingly positioned at an upper end thereof in, the open bottom of the circular-cylindrically-shaped top cap of the hollow canister.

YET STILL ANOTHER OBJECT of the present invention is to provide an automated closed loop petroleum based hydrocarbon fluid filtration and recycling system wherein the hollow, open-ended, and circular-cylindrically-shaped body of the hollow canister encases the third filtering stage and the fourth filtering stage.

STILL YET ANOTHER OBJECT of the present invention is to provide an automated closed loop petroleum based hydrocarbon fluid filtration and recycling system wherein the hollow canister further includes a circular-cylindrically-shaped bottom cap that has a circular-shaped and substantially closed bottom with a pair of spaced-apart drain throughbores extending vertically therethrough, and a circular-shaped open top that is in fluid communication with, and is replaceably sealingly positioned to, a lower end of the hollow, open-ended, and circular-cylindrically-shaped body of the hollow canister.

YET STILL ANOTHER OBJECT of the present invention is to provide an automated closed loop petroleum based hydrocarbon fluid filtration and recycling system wherein the third filtering stage includes a porous polyester draw bag that is removably secured, by a draw string, around the hollow and cylindrically-shaped portion of the center of the inner surface of the circular-shaped closed top of the circular-cylindrically-shaped top cap of the hollow canister and extends vertically downwardly therefrom, with the circumferentially-disposed and radially-outwardly-extending flange of the open lower end of the hollow and cylindrically-shaped portion of the center of the inner surface of the circular-shaped top of the circular-cylindrically-shaped top cap of the hollow canister providing a seal therebetween against leaks, while the draw string of the porous polyester draw bag of the third filtering stage contained in the hollow canister allows for quick and easy replacement thereof.

STILL YET ANOTHER OBJECT of the present invention is to provide an auto,hated closed loop petroleum based hydrocarbon fluid filtration and recycling system wherein the porous polyester draw bag of the third filtering stage contained in the hollow canister is 4" in diameter, 12" in length, and has a porosity in the range of 100–200 microns when the spent petroleum based hydrocarbon fluid is a cleaning solvent, and has a porosity in the range of 50–100 microns when the spent petroleum based hydrocarbon fluid is a blanket wash.

YET STILL ANOTHER OBJECT of the present invention is to provide an automated closed loop petroleum based hydrocarbon fluid filtration and recycling system wherein the porous polyester draw bag of the third filtering stage is 200 microns when the spent petroleum based hydrocarbon fluid is a cleaning solvent, and is 50 microns when the spent petroleum based hydrocarbon fluid is a blanket wash.

STILL YET ANOTHER OBJECT of the present invention is to provide an automated closed loop petroleum based hydrocarbon fluid filtration and recycling system wherein the porous polyester draw bag of the third filtering stage contains charcoal that adsorbs grease and dirt from the spent petroleum based hydrocarbon fluid passing therethrough.

YET STILL ANOTHER OBJECT of the present invention is to provide an automated closed loop petroleum based hydrocarbon fluid filtration and recycling system wherein the charcoal contained in the porous polyester draw bag of the third filtering stage is F-300 mesh made from real coal and not derivatives of a group consisting of coconut and wood.

STILL YET ANOTHER OBJECT of the present invention is to provide an automated closed loop petroleum based hydrocarbon fluid filtration and recycling system that further includes a nylon filter disposed over the lower open end of the hollow and cylindrically-shaped portion of the center of the inner surface of the circular-cylindrically-shaped top cap of the hollow canister, so that a barrier for the charcoal contained in the porous polyester draw bag of the third filtering stage contained in the hollow canister is provided since fluid seeks its own level and when the submersible internal pump is inoperative the spent petroleum based hydrocarbon fluid will return back down through the connecting apparatus and have a tendency to carry with it particles of the charcoal contained in the porous polyester draw bag of the third filtering stage contained in the hollow canister.

YET STILL ANOTHER OBJECT of the present invention is to provide an automated closed loop petroleum based hydrocarbon fluid filtration and recycling system wherein the fourth filtering stage includes a porous polyester draw bag that is contained in the hollow canister and encases the third porous polyester draw bag of the third filtering stage contained in the hollow canister.

STILL YET ANOTHER OBJECT of the present invention is to provide an automated closed loop petroleum based hydrocarbon fluid filtration and recycling system wherein the porous polyester draw bag of the fourth filtering stage is removably secured, by a draw string, around the hollow and cylindrically-shaped portion of the center of the inner surface of the circular-cylindrically-shaped top cap of the hollow canister and extends vertically downwardly therefrom, with the circumferentially-disposed and radially-outwardly-extending flange of the lower open end of the hollow and cylindrically-shaped portion of the inner surface of the circular-shaped closed top of the circular-cylindrically-shaped top cap of the hollow canister providing a seal therebetween against leaks, while the draw string of the porous polyester draw bag of the fourth filtering stage contained in the hollow canister allows for quick and easy replacement thereof.

YET STILL ANOTHER OBJECT of the present invention is to provide an automated closed loop petroleum based hydrocarbon fluid filtration and recycling system wherein the porous polyester draw bag of the fourth filtering stage is 6" in diameter, 18" in length, and has a porosity in the range of 1–100 microns when the spent petroleum based hydrocarbon fluid is a cleaning solvent, and has a porosity in the range of 1–50 microns when the spent petroleum based hydrocarbon fluid is a blanket wash.

STILL YET ANOTHER OBJECT of the present invention is to provide an automated closed loop petroleum based hydrocarbon fluid filtration and recycling system wherein the porosity of the porous polyester draw bag of the fourth filtering stage is 100 microns when the spent petroleum based hydrocarbon fluid is a cleaning solvent, and is 5 microns when the spent petroleum based hydrocarbon fluid is a blanket wash.

YET STILL ANOTHER OBJECT of the present invention is to provide an automated closed loop petroleum based hydrocarbon fluid filtration and recycling system wherein the porous polyester draw bag of the fourth filtering stage contained in the hollow canister contains fuller's earth that adsorbs discoloration from the spent petroleum based hydrocarbon fluid passing therethrough, since fuller's earth is a decolorizer and a bleaching agent.

FINALLY, STILL YET ANOTHER OBJECT of the present invention is to provide an method of using an on-site automated closed loop petroleum based hydrocarbon fluid filtration and recycling system that includes the steps of passing a spent petroleum based hydrocarbon fluid into an empty porous polyester draw bag of a first filtering stage of the on-site automated closed loop petroleum based hydrocarbon fluid filtration and recycling system, via an inlet throughport in a lid of the on-site automated closed loop petroleum based hydrocarbon fluid filtration and recycling system, where large particles of dirt and grease are removed from the spent petroleum based hydrocarbon fluid passing therethrough, passing the spent petroleum based hydrocarbon fluid that previously past through the empty porous polyester draw bag of the first filtering stage into an empty porous polyester draw bag of a second filtering stage of the on-site automated closed loop petroleum based hydrocarbon fluid filtration and recycling system, which encases the empty porous polyester draw bag of the first filtering stage, where small particles of dirt and grease are removed from the spent petroleum based hydrocarbon fluid passing therethrough, falling downwardly the spent petroleum based hydrocarbon fluid that previously past through the empty porous polyester draw bag of the second filtering stage, by gravity, to a lower portion of a hollow and open-top fluid reservoir of the on-site automated closed loop petroleum based hydrocarbon fluid filtration and recycling system, drawing in the spent petroleum based hydrocarbon fluid at the lower portion of the hollow and open-top fluid reservoir into a submersible internal pump, pumping the spent petroleum based hydrocarbon fluid upwardly through a substantially Z-shaped internal conduit of the on-site automated closed loop petroleum based hydrocarbon fluid filtration and recycling system, passing the spent petroleum based hydrocarbon fluid through a hollow and cylindrically-shaped portion of a circular-cylindrically-shaped top cap of a hollow canister of the on-site automated closed loop petroleum based hydrocarbon fluid filtration and recycling system, passing the spent petroleum based hydrocarbon fluid that previously past through the hollow and cylindrically-shaped portion of the circular-cylindrically-shaped top cap of the hollow canister into a porous polyester draw bag of a third filtering stage contained in the hollow canister where charcoal contained in the porous polyester draw bag of the third filtering stage contained in the hollow canister adsorbs grease and dirt from the spent petroleum based hydrocarbon fluid passing therethrough, while the porous polyester draw bag of the third filtering stage contained in the hollow canister eliminates large particles of dirt and grease from the spent petroleum based hydrocarbon fluid passing therethrough, passing the spent petroleum based hydrocarbon fluid that previously past through the porous polyester draw bag of the third filtering stage through a porous polyester draw bag of a fourth filtering stage where fuller's earth contained in the porous polyester draw bag of the fourth filtering stage contained in the hollow canister adsorbs discoloration from the spent petroleum based hydrocarbon fluid passing therethrough, while the porous polyester draw bag of the fourth filtering stage contained in the hollow canister eliminates small particles of dirt and grease from the spent petroleum based hydrocarbon fluid passing therethrough, passing downwardly, by gravity, the recycled petroleum based hydrocarbon fluid that previously past through the porous polyester draw bag of the fourth filtering stage through a pair of spaced-apart drain throughbores in a circular-shaped and substantially closed bottom of a circular-cylindrically-shaped bottom cap of the hollow canister to the lower portion of the hollow and open-top fluid reservoir, repeating for a time duration controlled by an external timer of the on-site automated closed loop petroleum based hydrocarbon fluid filtration and recycling system, pumping concurrently the recycled petroleum based hydrocarbon fluid, by an external pump, up through a conduit to a device from which the spent petroleum based hydrocarbon fluid has been recycled for reuse, so that the recycled petroleum based hydrocarbon fluid is dispensed while the spent petroleum based hydrocarbon fluid is simultaneously recycled.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING 10 on-site automated closed loop petroleum based hydrocarbon fluid filtration and recycling system of the present invention
12 small parts cleaning sink drain
14 small parts cleaning sink
16 inlet throughport
18 inlet throughport conduit
20 spent, dirty, and contaminated petroleum based hydrocarbon cleaning solvent
22 filtered, recycled, and clean petroleum based hydrocarbon cleaning solvent
24 outlet throughport
26 outlet throughport conduit
25 outlet throughport conduit free end
27 external outlet pump
28 in-line small parts cleaning sink spicket
30 printing press cleaning system outlet port
32 printing press
34 spent, dirty, and contaminated petroleum based hydrocarbon blanket wash
36 filtered, recycled, and clean petroleum based hydrocarbon blanket wash
38 in-line printing press cleaning system inlet port
40 hollow and open-top fluid reservoir
42 fluid reservoir closed bottom
44 fluid reservoir closed bottom inner surface
46 fluid reservoir open top
47 reservoir lid outer surface
48 fluid reservoir lid
49 reservoir inner surface
50 reservoir lid pair of spaced-apart third and fourth stage filtering canister mounting throughbores
52 reservoir lid power line throughbore
54 submersible internal pump
56 external timer
58 pump conduit
60 inlet throughport external fitting
62 inlet throughport external fitting hollow, cylindrically-shaped, and wide lower portion
64 inlet throughport external fitting hollow, cylindrically-shaped, and narrow upper portion
66 inlet throughport internal fitting
68 inlet throughport internal fitting hollow and cylindrically-shaped portion
70 inlet throughport internal fitting circumferentially-disposed and radially-outwardly-extending flange
72 first filtering stage
74 first filtering stage empty porous polyester draw bag
75 first filtering stage bag drawstring
76 second filtering stage
77 second filtering stage drawstring
78 second filtering stage empty porous polyester draw bag
82 third and fourth filtering stages hollow canister
84 third and fourth filtering stages canister circular-cylindrically-shaped top cap
86 third and fourth filtering stages canister top cap circular-shaped closed top
88 third and fourth filtering stages canister top cap circular-shaped closed top outer surface
90 third and fourth filtering stages canister top cap circular-shaped closed top inner surface
92 third and fourth filtering stages canister top cap open bottom
94 third and fourth filtering stages canister hollow and cylindrically-shaped side
96 third and fourth filtering stages canister side throughbore
98 third and fourth filtering stages canister top cap top outer surface pair of spaced-apart and threaded canister mounting rods
100 third and fourth filtering stages canister mounting nuts
102 third and fourth filtering stages canister top cap top inner surface center hollow and cylindrically-shaped portion
104 third and fourth filtering stages canister top cap top inner surface portion circumferentially-disposed and radially-outwardly-extending flange 106 third and fourth filtering stages canister top cap top inner surface portion horizontally-outwardly extending inlet tube
108 substantially Z-shaped internal pump conduit
110 internal pump conduit lower end
112 internal pump conduit upper end
114 third and fourth filtering stages canister hollow, open-ended, and circular-cylindrically-shaped body
116 third and fourth filtering stages canister circular-cylindrically-shaped bottom cap
118 third and fourth filtering stages canister bottom cap circular-shaped and substantially closed bottom
120 third and fourth filtering stages canister bottom cap pair of spaced-apart throughbores
122 third and fourth filtering stages canister bottom cap circular-shaped open top
124 third filtering stage
126 third filtering stage porous polyester draw bag
127 third filtering stage bag drawstring
128 third filtering stage charcoal
129 third filtering stage nylon screen
130 fourth filtering stage
132 fourth filtering stage porous polyester draw bag
133 fourth filtering stage bag drawstring
134 fourth filtering stage fuller's earth

DETAILED DESCRIPTION OF THE PREFERRED EMBODIMENT

Figure 1:
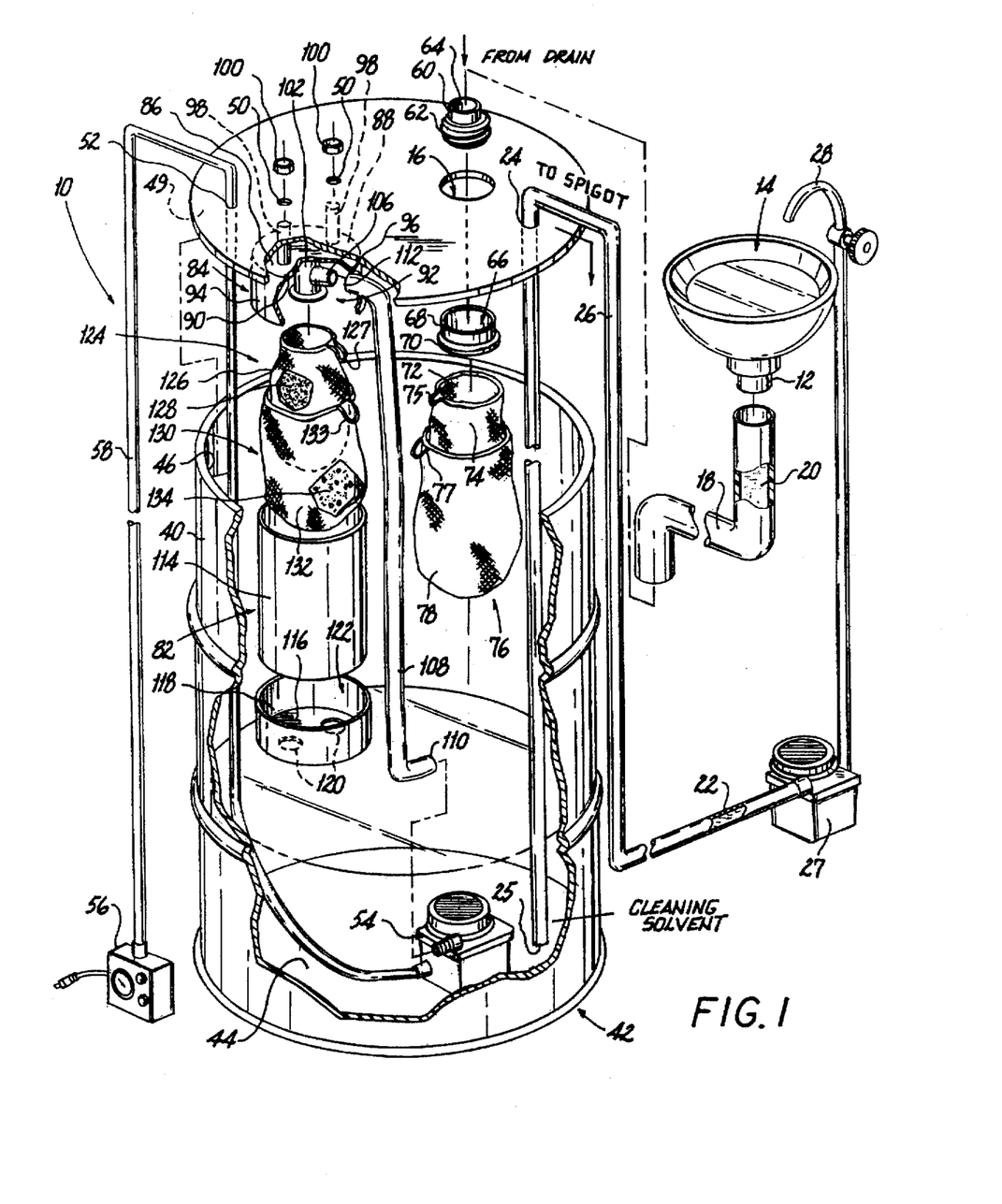
FIG. 1 is an exploded perspective view of the present invention in-line with a sink and automatically filtering and recycling the cleaning solvent draining therefrom.

Referring now to the figures in which like numerals indicate like parts, and particularly to FIG. 1, which is an exploded perspective view of the present invention in-line with a sink and automatically filtering and recycling the cleaning solvent draining therefrom, the on-site automated closed loop petroleum based hydrocarbon fluid filtration and recycling system of the present invention is shown generally at 10 connected in-line with a small parts cleaning sink drain 12 of a small parts cleaning sink 14, via an inlet throughport 16 and an inlet throughport conduit 18 which is in fluid communication with the inlet throughport 16, and continuously receives, filters, and recycles spent, dirty, and contaminated petroleum based hydrocarbon cleaning solvent 20 coming from the small parts cleaning sink drain 12 of the small parts cleaning sink 14.

The on-site automated closed loop petroleum based hydrocarbon fluid filtration and recycling system 10 concurrently and continuously returns filtered, recycled, and clean petroleum based hydrocarbon cleaning solvent 22, via an outlet throughport 24 and an outlet throughport conduit 26 which has a outlet throughport conduit free end 25 and which is in fluid communication with the outlet throughport 24 and via an external outlet pump 27 which is in fluid communication with the outlet throughport conduit 26, to an in-line small parts cleaning sink spicket 28 of the small parts cleaning sink 14.

Figure 2:
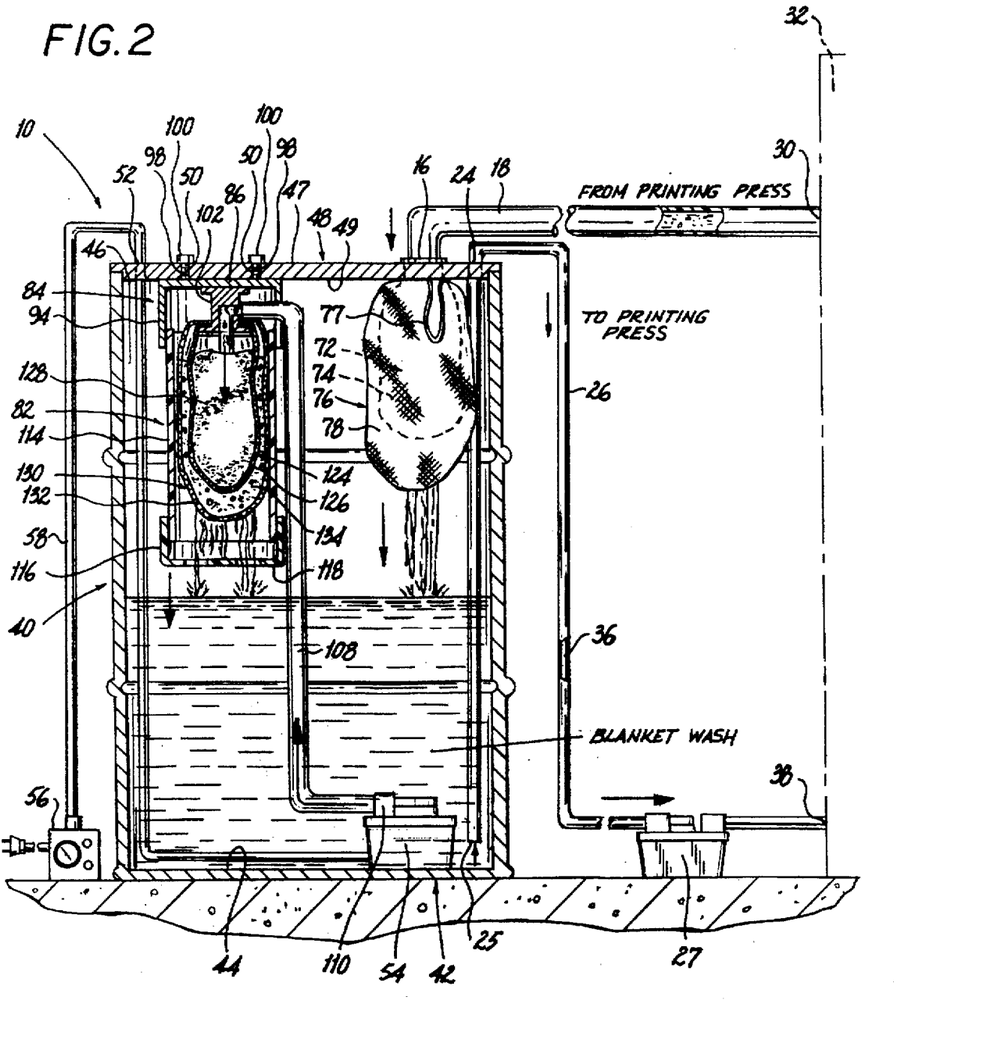
FIG. 2 is a cross sectional view of the present invention in-line with a printing press and automatically filtering and recycling the blanket wash therefrom.

As shown in FIG. 2, which is a cross sectional view of the present invention in-line with a printing press and automatically filtering and recycling the blanket wash therefrom, the on-site automated closed loop petroleum based hydrocarbon fluid filtration and recycling system 10 is connected in-line with a printing press cleaning system outlet port 30 of a printing press 32, via the inlet throughport 16 and the inlet throughport conduit 18, and continuously receives, filters, and recycles spent, dirty, and contaminated petroleum based hydrocarbon blanket wash 34 coming from the printing press cleaning system outlet port 30 of the printing press 32.

The on-site automated closed loop petroleum based hydrocarbon fluid filtration and recycling system 10 concurrently and continuously returns filtered, recycled, and clean petroleum based hydrocarbon blanket wash 36, via the outlet throughport 24 and the outlet throughport conduit 26 and the external outlet pump 27, to an in-line printing press cleaning system inlet port 38 of the printing press 32.

It is to be understood, however, that the description, supra, of the on-site automated closed loop petroleum based hydrocarbon fluid filtration and recycling system 10 being utilized to clean the spent, dirty, and contaminated petroleum based hydrocarbon cleaning solvent 20 and the spent, dirty, and contaminated petroleum based hydrocarbon blanket wash 34 are for illustrative purposes only, and that the on-site automated closed loop petroleum based hydrocarbon fluid filtration and recycling system 10 can be connected in-line to any device for cleaning any petroleum based hydrocarbon fluid emanating therefrom without departing in any way from the spirit of the present invention.

The on-site automated closed loop petroleum based hydrocarbon fluid filtration and recycling system 10 includes a hollow and open-top fluid reservoir 40 that has a fluid reservoir closed bottom 42 with a fluid reservoir closed bottom inner surface 44, a fluid reservoir open top 46 which is open and disposed above the fluid reservoir closed bottom 42 of the hollow and open-top fluid reservoir 40, and a fluid reservoir lid 48 with a reservoir lid outer surface 47 and a reservoir inner surface 49 and which selectively opens and closes the fluid reservoir open top 46 of the hollow and open-top fluid reservoir 40, so that the internal components housed in the hollow and open-top fluid reservoir 40 can be readily serviced.

The hollow and open-top fluid reservoir 40 is preferably a 55 gallon circular-cylindrically-shaped and open-top drum and the fluid reservoir lid 48 of the hollow and open-top fluid reservoir 40 is preferably a circular-shaped lid compatible with the 55 gallon circular-cylindrically-shaped open-top drum.

The fluid reservoir lid 48 of the hollow and open-top fluid reservoir 40 has the inlet throughport 16 extending vertically therethrough, and the outlet throughport 24 extending vertically therethrough with the outlet throughport conduit 26 passing sealing therethrough and terminating at the outlet conduit free end 25 thereof in the hollow and open-top fluid reservoir 40 slightly above the fluid reservoir closed bottom inner surface 44 of the fluid reservoir closed bottom 42 of the hollow and open-top fluid reservoir 40.

The fluid reservoir lid 48 of the hollow and open-top fluid reservoir 40 further has a reservoir lid pair of spaced-apart third and fourth stage filtering canister mounting throughbores 50 extending vertically therethrough, and a reservoir lid power line throughbore 52 extending vertically therethrough.

The on-site automated closed loop petroleum based hydrocarbon fluid filtration and recycling system 10 further includes a submersible internal pump 54 disposed in the hollow and open-top fluid reservoir 40 on the fluid reservoir closed bottom inner surface 44 of the fluid reservoir closed bottom 42 of the hollow and open-top fluid reservoir 40, in proximity to the outlet throughport conduit free end 25 of the outlet throughport conduit 26.

It is to be understood that the submersible internal pump 54 can preferably be either electric or hydraulic without departing in any way from the spirit of the present invention.

The on-site automated closed loop petroleum based hydrocarbon fluid filtration and recycling system 10 further includes an external timer 56 that is disposed externally to the hollow and open top fluid reservoir 40 and is in communication with the submersible internal pump 54 through a pump conduit 58, whether it be electrical or hydraulic which ever the case may be, that extends from the external timer 56, sealingly through the reservoir lid power line throughbore 52 in the fluid reservoir lid 48 of the hollow and open-top fluid reservoir 40, and to the submersible internal pump 54.

The external timer 56 provides control over the operating time of the submersible internal pump 54 and thereby the overall operating time of the on-site automated closed loop petroleum based hydrocarbon fluid filtration and recycling system 10, which is preferably approximately twice the operating time of the device from which the petroleum based hydrocarbon fluid is to be recycled.

The on-site automated closed loop petroleum based hydrocarbon fluid filtration and recycling system 10 further includes an inlet throughport external fitting 60 that has an inlet throughport external fitting hollow, cylindrically-shaped, and wide lower portion 62 that sealingly passes vertically downwardly through the inlet throughport 16 in the fluid reservoir lid 48 of the hollow and open-top fluid reservoir 40 and extends vertically downwardly slightly past the reservoir lid inner surface 49 of the fluid reservoir lid 48 of the hollow and open-top fluid reservoir 40.

The inlet throughport external fitting 60 further has an inlet throughport external fitting hollow, cylindrically-shaped, and narrow upper portion 64 that is collinear with, in fluid communication with, and narrower than, the inlet throughport external fitting hollow, cylindrically-shaped, and wide lower portion 62 of the inlet throughport external fitting 60 and extends vertically upwardly slightly past the reservoir lid outer surface 47 of the fluid reservoir lid 48 of the hollow and open-top fluid reservoir 40.

The inlet throughport external fitting hollow, cylindrically-shaped, and narrow upper portion 64 of the inlet throughport external fitting 60 is sealing connected to, and in fluid communication with, the inlet throughport conduit 18.

The on-site automated closed loop petroleum based hydrocarbon fluid filtration and recycling system 10 further includes an inlet throughport internal fitting 66 that has an inlet throughport internal fitting hollow and cylindrically-shaped portion 68 with an inlet throughport internal fitting circumferentially-disposed and radially-outwardly-extending flange 70 that extends circumferentially around, and radially outwardly from, the lower end of the inlet throughport internal fitting hollow and cylindrically-shaped portion 68 of the inlet throughport internal fitting 66.

The inlet throughport internal fitting hollow and cylindrically-shaped portion 68 of the inlet throughport internal fitting 66 sealingly passes vertically upwardly through the inlet throughport 16 in the fluid reservoir lid 48 of the hollow and open-top fluid reservoir 40, with the inlet throughport internal fitting circumferentially-disposed and radially-outwardly-extending flange 70 of the lower end of the inlet throughport internal fitting hollow and cylindrically-shaped portion 68 of the inlet throughport internal fitting 66 disposed below the reservoir lid 48, and snugly engages, and is in fluid communication with, the inlet throughport external fitting hollow, cylindrically-shaped, and wide lower portion 62 of the inlet throughport external fitting 60, with the fluid reservoir lid 48 of the hollow and open-top fluid reservoir 40 being engaged therebetween.

The on-site automated closed loop petroleum based hydrocarbon fluid filtration and recycling system 10 further includes a first filtering stage 72 that is contained in the hollow and open-top fluid reservoir 40 and is a first filtering stage empty porous polyester draw bag 74 that is removably secured, by a first filtering stage bag drawstring 75, around the inlet throughport internal fitting hollow and cylindrically-shaped portion 68 of the inlet throughport internal fitting 66 and extends vertically downwardly therefrom, with the inlet throughport internal fitting circumferentially-disposed and radially-outwardly-extending flange 70 of the lower end of the inlet throughport internal fitting hollow and cylindrically-shaped portion 68 of the inlet throughport internal fitting 66 providing a seal therebetween against leaks, while the first filtering stage bag drawstring 75 of the first filtering stage empty porous polyester draw bag 74 of the first filtering stage 72 allows for quick and easy replacement thereof.

The first filtering stage empty porous polyester draw bag 74 of the first filtering stage 72 is preferably 4" in diameter, 12"1143 in length, and eliminates large particles of dirt and grease from the petroleum based hydrocarbon fluid passing therethrough.

In the case when the petroleum based hydrocarbon fluid is the contaminated petroleum based hydrocarbon cleaning solvent 20, the porosity of the first filtering stage empty porous polyester draw bag 74 of the first filtering stage 72 is preferably 200 microns but would, however, satisfactory operate in the range of 100–200 microns, while in the case when the petroleum based hydrocarbon fluid is the contaminated petroleum based hydrocarbon blanket wash 34, the porosity of the first filtering stage empty porous polyester draw bag 74 of the first filtering stage 72 is preferably 50 microns but would, however, satisfactory operate in the range of 50–100 microns.

The values of porosity mentioned, supra, are of critical importance and are based upon empirical data accumulated during experimentation, since it is imperative that the level of porosity of the first filtering stage empty porous polyester draw bag 74 of the first filtering stage 72 be compatible with the petroleum based hydrocarbon fluid passing therethrough, bearing in mind that if the porosity is too low the pores would clog, and if the porosity was too high the pores would not filter. In either case, the first filtering stage 72 would be rendered inoperative for its intended purpose.

The on-site automated closed loop petroleum based hydrocarbon fluid filtration and recycling system 10 further includes a second filtering stage 76 that is contained in the hollow and open-top fluid reservoir 40 and is a second filtering stage empty porous polyester draw bag 78 that encases the first filtering stage empty porous polyester draw bag 74 of the first filtering stage 72, and extends vertically downwardly from, and is secured around, by a second filtering stage drawstring 77, the inlet throughport internal fitting hollow and cylindrically-shaped portion 68 of the inlet throughport internal fitting 66, with the inlet throughport internal fitting circumferentially-disposed and radially-outwardly-extending flange 70 of the lower end of the inlet throughport internal fitting hollow and cylindrically-shaped portion 68 of the inlet throughport internal fitting 66 providing a seal therebetween against leaks, while the second filtering stage drawstring 77 of the second filtering stage empty porous polyester draw bag 78 of the second filtering stage 76 allows for quick and easy replacement thereof.

The second filtering stage empty porous polyester draw bag 78 of the second filtering stage 76 is preferably 6" in diameter, 18" in length, and eliminates small particles of dirt and grease from the petroleum based hydrocarbon fluid passing therethrough that were not eliminated by the first filtering stage empty porous polyester draw bag 74 of the first filtering stage 72.

In the case when the petroleum based hydrocarbon fluid is the contaminated petroleum based hydrocarbon cleaning solvent 20, the porosity of the second filtering stage empty porous polyester draw bag 78 of the second filtering stage 76 is preferably 100 microns but would, however, satisfactory operate in the range of 1–100 microns, while in the case when the petroleum based hydrocarbon fluid is the contaminated petroleum based hydrocarbon blanket wash 34, the porosity of the second filtering stage empty porous polyester draw bag 78 of the second filtering stage 76 is preferably 5 microns but would, however, satisfactory operate in the range of 1–50 microns.

The values of porosity mentioned, supra, are of critical importance and are based upon empirical data accumulated during experimentation, since it is imperative that the level of porosity of the second filtering stage empty porous polyester draw bag 78 of the second filtering stage 76 be compatible with the petroleum based hydrocarbon fluid passing therethrough, bearing in mind that if the porosity is too low the pores would clog, and if the porosity was too high the pores would not filter. In either case, the second filtering stage 76 would be rendered inoperative for its intended purpose.

The on-site automated closed loop petroleum based hydrocarbon fluid filtration and recycling system 10 further includes a third and fourth filtering stages hollow canister 82 that is contained in the hollow and open-top fluid reservoir 14 and disposed in tandem to the first filtering stage 72 and the second filtering stage 76.

The third and fourth filtering stages hollow canister 82 includes a third and fourth filtering stages canister circular-cylindrically-shaped top cap 84 that has a third and fourth filtering stages canister top cap circular-shaped closed top 86 with a third and fourth filtering stages canister top cap circular-shaped closed top outer surface 88 and a third and fourth filtering stages canister top cap circular-shaped closed top inner surface 90 with a center, a third and fourth filtering stages canister top cap open bottom 92, and a third and fourth filtering stages canister hollow and cylindrically-shaped side 94 with a third and fourth filtering stages canister side throughbore 96 extending horizontally therethrough.

The third and fourth filtering stages canister circular-cylindrically-shaped top cap 84 of the third and fourth filtering stages hollow canister 82 further has a third and fourth filtering stages canister top cap top outer surface pair of spaced-apart and threaded canister mounting rods 98 that extend vertically upwardly from a diameter of the third and fourth filtering stages canister top cap circular-shaped closed top outer surface 88 of the third and fourth filtering stages canister top cap circular-shaped closed top 86 of the third and fourth filtering stages canister circular-cylindrically-shaped top cap 84 of the third and fourth filtering stages hollow canister 82.

The third and fourth filtering stages canister top cap top outer surface pair of spaced-apart and threaded canister mounting rods 98 of the diameter of the third and fourth filtering stages canister top cap circular-shaped closed top outer surface 88 of the third and fourth filtering stages canister top cap circular-shaped closed top 86 of the third and fourth filtering stages canister circular-cylindrically-shaped top cap 84 of the third and fourth filtering stages hollow canister 82 pass through the reservoir lid pair of spaced-apart third and fourth stage filtering canister mounting throughbores 50 in the fluid reservoir lid 48 of the hollow and open-top fluid reservoir 40 and threadably engage third and fourth filtering stages canister mounting nuts 100, with the third and fourth filtering stages canister top cap circular-shaped closed top outer surface 88 of the third and fourth filtering stages canister top cap circular-shaped closed top 86 of the third and fourth filtering stages canister circular-cylindrically-shaped top cap 84 of the third and fourth filtering stages hollow canister 82 abutting against the reservoir lid inner surface 49 of the fluid reservoir lid 48 of the hollow and open-top fluid reservoir 40.

The third and fourth filtering stages canister circular-cylindrically-shaped top cap 84 of the third and fourth filtering stages hollow canister 82 further has a third and fourth filtering stages canister top cap top inner surface center hollow and cylindrically-shaped portion 102 that extends vertically downwardly from the center of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82, in a position equidistant between the vertical axes of the third and fourth filtering stages canister top cap top outer surface pair of spaced-apart and threaded canister mounting rods 98 of the third and fourth filtering stages canister top cap circular-shaped closed top outer surface 88 of the third and fourth filtering stages canister top cap circular-shaped closed top 86 of the third and fourth filtering stages canister circular-cylindrically-shaped top cap 84 of the third and fourth filtering stages hollow canister 82.

The third and fourth filtering stages canister top cap top inner surface center hollow and cylindrically-shaped portion 102 of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82 has a third and fourth filtering stages canister top cap top inner surface portion circumferentially-disposed and radially-outwardly-extending flange 104 that extends circumferentially around, and radially outwardly from, the lower end of the third and fourth filtering stages canister top cap top inner surface center hollow and cylindrically-shaped portion 102 of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82.

The third and fourth filtering stages canister top cap top inner surface center hollow and cylindrically-shaped portion 102 of the center of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82 further has a third and fourth filtering stages canister top cap top inner surface portion horizontally-outwardly extending inlet tube 106 that extends horizontally outwardly therefrom and is in fluid communication therewith.

The on-site automated closed loop petroleum based hydrocarbon fluid filtration and recycling system 10 further includes a substantially Z-shaped internal pump conduit 108 that has an internal pump conduit lower end 110 that is connected to, and in fluid communication with, the submersible internal pump 54, and an internal pump conduit upper end 112 that passes through the third and fourth filtering stages canister cylindrically-shaped side throughbore 96 in the third and fourth filtering stages canister hollow and cylindrically-shaped side 94 of the third and fourth filtering stages canister circular-cylindrically-shaped top cap 84 of the third and fourth filtering stages hollow canister 82, and is sealingly connected to, and in fluid communication with, the third and fourth filtering stages canister top cap top inner surface portion horizontally-outwardly extending inlet tube 106 of the third and fourth filtering stages canister top cap top inner surface center hollow and cylindrically-shaped portion 102 of the center of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82, so that the submersible internal pump 54 is in fluid communication with the third and fourth filtering stages hollow canister 82.

The third and fourth filtering stages hollow canister 82 further includes a third and fourth filtering stages canister hollow, open-ended, and circular-cylindrically-shaped body 114 that extends vertically downwardly from, is in fluid communication with, and is replaceably sealingly positioned at its upper end in, the third and fourth filtering stages canister top cap open bottom 92 of the third and fourth filtering stages canister circular-cylindrically-shaped top cap 84 of the third and fourth filtering stages hollow canister 82.

The third and fourth filtering stages hollow canister 82 further includes a third and fourth filtering stages canister circular-cylindrically-shaped bottom cap 116 that has a third and fourth filtering stages canister bottom cap circular-shaped and substantially closed bottom 118 with a third and fourth filtering stages canister bottom cap pair of spaced-apart throughbores 120 extending vertically therethrough, and a third and fourth filtering stages canister bottom cap circular-shaped open top 122 that is in fluid communication with, and is replaceably sealingly positioned to the lower end of, the third and fourth filtering stages canister hollow, open-ended, and circular-cylindrically-shaped body 114 of the third and fourth filtering stages hollow canister 82.

The third and fourth filtering stages hollow canister 82 contains a third filtering stage 124 which includes a third filtering stage porous polyester draw bag 126 that is removably secured, by a third filtering stage bag drawstring 127, around the third and fourth filtering stages canister top cap top inner surface center hollow and cylindrically-shaped portion 102 of the center of the third and fourth filtering stages canister top cap top inner surface 90 of the third and fourth filtering stages canister circular-cylindrically-shaped top cap 84 of the third and fourth filtering stages hollow canister 82 and extends vertically downwardly therefrom, with the third and fourth filtering stages canister top cap top inner surface portion circumferentially-disposed and radially-outwardly-extending flange 104 of the third and fourth filtering stages canister top cap top inner surface center hollow and cylindrically-shaped portion 102 of the center of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82 providing a seal therebetween against leaks, while the third filtering stage bag drawstring 127 of the third filtering stage porous polyester draw bag 126 of the third filtering stage 124 contained in the third and fourth filtering stages hollow canister 82 allows for quick and easy replacement thereof.

The third filtering stage porous polyester draw bag 126 of the third filtering stage 124 contained in the third and fourth filtering stages hollow canister 82 is preferably 4" in diameter, 12" in length, and eliminates remaining large particles of dirt and grease from the petroleum based hydrocarbon fluid passing therethrough.

In the case when the petroleum based hydrocarbon fluid is the contaminated petroleum based hydrocarbon cleaning solvent 20, the porosity of the third filtering stage porous polyester draw bag 126 of the third filtering stage 124 contained in the third and fourth filtering stages hollow canister 82 is preferably 200 microns but would, however, satisfactory operate in the range of 100–200 microns, while in the case when the petroleum based hydrocarbon fluid is the contaminated petroleum based hydrocarbon blanket wash 34, the porosity of the third filtering stage porous polyester draw bag 126 of the third filtering stage 124 contained in the third and fourth filtering stages hollow canister 82 is preferably 50 microns but would, however, satisfactory operate in the range of 50–100 microns.

The values of porosity mentioned, supra, are of critical importance and are based upon empirical data accumulated during experimentation, since it is imperative that the level of porosity of the third filtering stage porous polyester draw bag 126 of the third filtering stage 124 contained in the third and fourth filtering stages hollow canister 82 be compatible with the petroleum based hydrocarbon fluid passing therethrough, bearing in mind that if the porosity is too low the pores would clog, and if the porosity was too high the pores would not filter. In either case, the third filtering stage 124 contained in the third and fourth filtering stages hollow canister 82 would be rendered inoperative for its intended purpose.

The third filtering stage porous polyester draw bag 126 of the third filtering stage 124 contained in the third and fourth filtering stages hollow canister 82 contains third filtering stage charcoal 128 that adsorbs grease and dirt from the spent petroleum based hydrocarbon fluid passing therethrough, and is preferably F-300 mesh made from real coal and not coconut or wood derivatives sold by Calgon Carbon Corp., P.O. Box 717, Pittsburgh, Pa. 15230-0707 under product code 249300.

The type of charcoal mentioned, supra, is of critical importance and is based upon empirical data accumulated during experimentation, since it is imperative that the level of adsorption, and thereby optimum operation, of the third filtering stage charcoal 128 contained in the third filtering stage porous polyester draw bag 126 of the third filtering stage 124 contained in the third and fourth filtering stages hollow canister 82 be compatible with the petroleum based hydrocarbon fluid passing therethrough.

Even though the F-300 mesh made from real coal and not a coconut or a wood derivative may be considered a negative limitation by some, it is the only way, and by far the clearest way, to state the limitation. It therefore must be considered in determining patentability. Support for this assertion can be found in the official notice entitled *"Practice Re: Technical Rejections,"* dated Apr. 30, 1965 (814 O.G. 715), which states that:

"The inclusion of a negative limitation shall not in itself, be considered a sufficient basis for objection to or rejection of a claim." [Emphasis added]

And, in In re Duva, 156 U.S.P.Q. 90, 94 (CCPA 1967), where the Court stated:

"... it [is] held proper to claim a negative limitation even at the ' point of novelty'. . ." [Emphasis added].

Knowing that a fluid seeks its own level, when the submersible internal pump 54 is inoperative the spent petroleum based hydrocarbon fluid will return back down through the substantially Z-shaped internal pump conduit 108 and have a tendency to carry with it particles of the third filtering stage charcoal 128 contained in the third filtering stage porous polyester draw bag 126 of the third filtering stage 124 contained in the third and fourth filtering stages hollow canister 82. To prevent this, a third filtering stage nylon screen 129, preferably a nylon hose, is placed over the lower open end of the third and fourth filtering stages canister top cap top inner surface center hollow and cylindrically-shaped portion 102 of the center of the third and fourth filtering stages canister top cap top inner surface 90 of the third and fourth filtering stages canister circular-cylindrically-shaped top cap 84 of the third and fourth filtering stages hollow canister 82, so that a barrier for the third filtering stage charcoal 128 contained in the third filtering stage porous polyester draw bag 126 of the third filtering stage 124 contained in the third and fourth filtering stages hollow canister 82 is provided.

The on-site automated closed loop petroleum based hydrocarbon fluid filtration and recycling system 10 further includes a fourth filtering stage 130 that is contained in the third and fourth filtering stages hollow canister 82 and includes a fourth filtering stage porous polyester draw bag 132 that encases the third filtering stage porous polyester draw bag 126 of the third filtering stage 124 contained in the third and fourth filtering stages hollow canister 82 and is removably secured, by a fourth filtering stage bag drawstring 133, around the third and fourth filtering stages canister top cap top inner surface center hollow and cylindrically-shaped portion 102 of the center of the third and fourth filtering stages canister top cap top inner surface 90 of the third and fourth filtering stages canister top cap circular-shaped closed top 86 of the third and fourth filtering stages canister circular-cylindrically-shaped top cap 84 of the third and fourth filtering stages hollow canister 82 and extends vertically downwardly therefrom, with the third and fourth filtering stages canister top cap top inner surface portion circumferentially-disposed and radially-outwardly-extending flange 104 of the lower end of the third and fourth filtering stages canister top cap top inner surface center hollow and cylindrically-shaped portion 102 of the center of the third and fourth filtering stages canister top cap circular-shaped closed top inner surface 90 of the third and fourth filtering stages canister top cap circular-shaped closed top 86 of the third and fourth filtering stages canister circular-cylindrically-shaped top cap 84 of the third and fourth filtering stages hollow canister 82 providing a seal therebetween against leaks, while the fourth filtering stage bag drawstring 133 of the fourth filtering stage porous polyester draw bag 132 of the fourth filtering stage 130 contained in the third and fourth filtering stages hollow canister 82 allows for quick and easy replacement thereof.

The fourth filtering stage porous polyester draw bag 132 of the fourth filtering stage 130 contained in the third and fourth filtering stages hollow canister 82 is preferably 6" in diameter, 18" in length, and eliminates remaining small particles of dirt and grease from the petroleum based hydrocarbon fluid passing therethrough that were not eliminated by the third filtering stage porous polyester draw bag 126 of the third filtering stage 124 contained in the third and fourth filtering stages hollow canister 82.

In the case when the petroleum based hydrocarbon fluid is the contaminated petroleum based hydrocarbon cleaning solvent 20, the porosity of the fourth filtering stage porous polyester draw bag 132 of the fourth filtering stage 130 in the third and fourth filtering stages hollow canister 82 is preferably 100 microns but would, however, satisfactory operate in the range of 1–100 microns, while in the case when the petroleum based hydrocarbon fluid is the contaminated petroleum based hydrocarbon blanket wash 34, the porosity of the fourth filtering stage porous polyester draw bag 132 of the fourth filtering stage 130 in the third and fourth filtering stages hollow canister 82 is preferably 5 microns but would, however, satisfactory operate in the range of 1–50 microns.

The values of porosity mentioned, supra, are of critical importance and are based upon empirical data accumulated during experimentation, since it is imperative that the level of porosity of the fourth filtering stage polyester draw bag 132 of the fourth filtering stage 130 contained in the third and fourth filtering stages hollow canister 82 be compatible with the petroleum based hydrocarbon fluid passing therethrough, bearing in mind that if the porosity is too low the pores would clog, and if the porosity was too high the pores would not filter. In either case, the fourth filtering stage 130 contained in the third and fourth filtering stages hollow canister 82 would be rendered inoperative for its intended purpose.

The fourth filtering stage porous polyester draw bag 132 of the fourth filtering stage 130 contained in the third and fourth filtering stages hollow canister 82 contains fourth filtering stage fuller's earth 134 that is sold by Hillard Corp., 100 West 4th Street, Elmira, N.Y. 14902-1504, and adsorbs discoloration from the darkening petroleum based hydrocarbon fluid passing therethrough, ipso facto, fuller's earth is a decolorizer and bleaching agent, as defined in McGraw-Hill *DICTIONARY OF SCIENTIFIC AND TECHNICAL TERMS,* Third Edition, by Sybil P. Parker:

"A natural, fine-grained, earthy material, such as a clay, with high adsorptive power; consists principally of hydrated aluminum silicates; used as an adsorbent in refining and decolorizing oils, as a catalyst, and as a bleaching agent. [Emphasis added]

The type of fuller's earth mentioned, supra, is of critical importance and is based upon empirical data accumulated during experimentation, since it is imperative that the level of adsorption, and thereby optimum operation, of the fourth filtering stage fuller's earth 134 contained in the fourth filtering stage porous polyester draw bag 132 of the fourth filtering stage 130 contained in the third and fourth filtering stages hollow canister 82 be compatible with the petroleum based hydrocarbon fluid passing therethrough.

The operation of the on-site automated closed loop petroleum based hydrocarbon fluid filtration and recycling system 10 will be discussed, infra:

STEP 1: The spent petroleum based hydrocarbon fluid enters the first filtering stage empty porous polyester draw bag 74 of the first filtering stage 72, via the inlet throughport 16.

STEP 2: The spent petroleum based hydrocarbon fluid passes through the first filtering stage empty porous polyester draw bag 74 of the first filtering stage 72 where large particles of dirt and grease are removed from the spent petroleum based hydrocarbon fluid passing therethrough.

STEP 3: The spent petroleum based hydrocarbon fluid then passes through the second filtering stage empty porous polyester draw bag 78 of the second filtering stage 76 where small particles of dirt and grease are removed from the spent petroleum based hydrocarbon fluid passing therethrough.

STEP 4: The spent petroleum based hydrocarbon fluid then falls downwardly, by gravity, to the lower portion of the hollow and open-top fluid reservoir 40.

STEP 5: The spent petroleum based hydrocarbon fluid at the lower portion of the hollow and open-top fluid reservoir 40 then is drawn into the submersible internal pump 54.

STEP 6: The submersible internal pump 54 then pumps the spent petroleum based hydrocarbon fluid upwardly through the substantially Z-shaped internal pump conduit 108.

STEP 7: The spent petroleum based then passes through the third and fourth filtering stages canister top cap top inner surface center hollow and cylindrically-shaped portion 102 of the third and fourth filtering stages canister circular-cylindrically-shaped top cap 84 of the third and fourth filtering stages hollow canister 82.

STEP 8: The spent petroleum based hydrocarbon fluid then passes through the third filtering stage porous polyester draw bag 126 of the third filtering stage 124 contained in the third and fourth filtering stages hollow canister 82 where the third filtering stage charcoal 128 contained in the third filtering stage porous polyester draw bag 126 of the third filtering stage 124 contained in the third and fourth filtering stages hollow canister 82 adsorbs grease and dirt, while the third filtering stage porous polyester draw bag 126 of the third filtering stage 124 contained in the third and fourth filtering stages hollow canister 82 eliminates any remaining large particles of dirt and grease from the spent petroleum based hydrocarbon fluid passing therethrough.

STEP 9: The spent petroleum based hydrocarbon fluid then passes through the fourth filtering stage porous polyester draw bag 132 of the fourth filtering stage 130 contained in the third and fourth filtering stages hollow canister 82 where the fourth filtering stage fuller's earth 134 contained in the fourth third filtering stage porous polyester draw bag 132 of the fourth filtering stage 130 contained in the third and fourth filtering stages hollow canister 82 decolorizes the spent petroleum based hydrocarbon fluid passing therethrough, while the fourth filtering stage porous polyester draw bag 132 of the fourth filtering stage 130 contained in the third and fourth filtering stages hollow canister 82 eliminates any remaining small particles of dirt and grease from the spent petroleum based hydrocarbon passing therethrough.

STEP 10: The recycled petroleum based hydrocarbon fluid then passes, by gravity, downwardly through the third and fourth filtering stages canister bottom cap pair of spaced-apart throughbores 120 in the third and fourth filtering stages canister bottom cap circular-shaped and substantially closed bottom 118 of the third and fourth filtering stages canister circular-cylindrically-shaped bottom cap 116 of the third and fourth filtering stages hollow canister 82 to the lower portion of the hollow and open-top fluid reservoir 40.

STEP 11: STEPS 5–10 are repeated for the time duration controlled by the external timer 56.

STEP 12: The recycled petroleum based hydrocarbon fluid then is concurrently pumped, by the external outlet pump 27, up through the outlet throughport conduit 26 to the device from which the spent petroleum based hydrocarbon fluid has been recycled for reuse, so that the recycled petroleum based hydrocarbon fluid is dispensed while the spent petroleum based hydrocarbon fluid is simultaneously recycled.

It will be understood that each of the elements described above, or two or more together, may also find a useful application in other types of constructions differing from the types described above.

While the invention has been illustrated and described as embodied in an on-site automated closed loop petroleum based hydrocarbon fluid filtration and recycling system, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An on-site automated closed loop petroleum based hydrocarbon fluid filtration and recycling system having an operating time and continuously recycling a spent petroleum based hydrocarbon fluid having a time of use and simultaneously continuously dispensing a recycled petroleum based hydrocarbon fluid which is the spent petroleum based hydrocarbon fluid after being recycled, comprising:

a) a hollow and open-top fluid reservoir having a closed bottom with an inner surface, and an open top disposed above said closed bottom of said hollow and open-top fluid reservoir;

b) a lid having an outer surface, an inner surface, an inlet throughport extending vertically therethrough, an output throughport extending vertically therethrough, and selectively opening and closing said open top of said hollow and open-top fluid reservoir, so that internal components housed in said hollow and open-top fluid reservoir can be readily serviced;

c) inlet means for inputting the spent petroleum based hydrocarbon fluid into said hollow and open-top fluid reservoir; said inlet means being disposed in said inlet throughport in said lid;

d) outlet means for outputting the recycled petroleum based hydrocarbon fluid from said hollow and open-top fluid reservoir; said outlet means being disposed in said outlet throughport in said lid;

e) a first filtering stage contained in said hollow and open-top fluid reservoir and being removably attached to said inlet means; said first filtering stage removing large particles of dirt and grease from the spent petroleum based hydrocarbon fluid passing therethrough;

f) a second filtering stage encasing said first filtering stage and being contained in said hollow and open-top fluid reservoir; said second filtering station being removably attached to said inlet means and removing small particles of dirt and grease from the spent petroleum based hydrocarbon fluid passing therethrough;

g) a submersible internal pump having an operating time and being disposed in said hollow and open-top fluid reservoir on said inner surface of said closed bottom of said hollow and open-top fluid reservoir, in proximity to said outlet means; said submersible internal pump drawing in the spent petroleum based hydrocarbon fluid passing through said second filtering stage;

h) a third filtering stage contained in said hollow and open-top fluid reservoir and being tandemly disposed to said first filtering stage and said second filtering stage; said third filtering stage adsorbing grease and dirt from the spent petroleum based hydrocarbon fluid passing therethrough;

i) connecting means for fluidly connecting said submersible internal pump to said third filtering stage and being contained in said hollow and open-top fluid reservoir; said connecting means transporting the spent petroleum based hydrocarbon fluid drawn in by said submersible internal pump to said third filtering stage; and j) a fourth filtering stage encasing said third filtering stage and being contained in said hollow and open-top fluid reservoir; said fourth filtering station removing discoloration from the spent petroleum based hydrocarbon fluid passing therethrough, so that the spent petroleum based hydrocarbon fluid passes downwardly through said first filtering stage and is purged of large particles of dirt and grease, then passes downwardly through said second filtering stage and is purged of small particles of dirt and grease, then is drawn into said submersible internal pump, then is pumped upwardly through said connecting means, then passes downwardly through said third filtering stage and is purged of dirt and grease, then passes downwardly through said fourth filtering stage and is purged of discolorations, then enters into said hollow and open-top fluid reservoir, and then is drawn into said outlet means as the recycled petroleum based hydrocarbon fluid.

2. The system as defined in claim 1, wherein said hollow and open-top fluid reservoir is a 55 gallon circular-cylindrically-shaped and open-top drum and said lid is a circular-shaped lid so as to be compatible with said 55 gallon circular-cylindrically-shaped open-top drum.

3. The system as defined in claim 1, wherein said outlet means is a conduit that passes sealingly through said outlet throughport in said lid and terminates at a free end thereof in said hollow and open-top fluid reservoir slightly above said inner surface of said closed bottom of said hollow and open-top fluid reservoir.

4. The system as defined in claim 1, wherein said lid further has a pair of spaced-apart canister mounting throughbores that extend vertically therethrough, and a power line throughbore that extends vertically therethrough.

5. The system as defined in claim 1, wherein said submersible internal pump is selected from the group consisting of electric and hydraulic.

6. The system as defined in claim 1; further comprising an external timer that is disposed externally of said hollow and open-top fluid reservoir; said external timer is in communication with said submersible internal pump through a conduit that extends from said external timer, sealingly through said power line throughbore in said lid, and to said submersible internal pump, so that the operating time of said submersible internal pump and thereby said operating time of said on-site automated closed loop petroleum based hydrocarbon fluid filtration and recycling system can be controlled.

7. The system as defined in claim 1, wherein said operating time of said on-site automated closed loop petroleum based hydrocarbon fluid filtration and recycling system is approximately twice the time of use of the spent petroleum based hydrocarbon fluid to be recycled.

8. The system as defined in claim 1, wherein said inlet means includes an external fitting that has a hollow, cylindrically-shaped, and wide lower portion that sealingly passes vertically downwardly into said inlet throughport in said lid slightly past said inner surface of said lid, and a hollow, cylindrically-shaped, and narrow upper portion that is collinear with, in fluid communication with, and narrower than, said hollow, cylindrically-shaped, and wide lower portion of said external fitting of said inlet means; said hollow, cylindrically-shaped, and narrow upper portion of said inlet means extends vertically upwardly slightly past said outer surface of said lid; said inlet means further includes an internal fitting that has a hollow and cylindrically-shaped portion with a circumferentially-disposed and radially-outwardly-extending flange that extends circumferentially around, and radially outwardly from, a lower end thereof; said hollow and cylindrically-shaped portion of said internal fitting of said inlet means sealingly passes vertically upwardly into said inlet throughport in said lid, with said circumferentially-disposed and radially-outwardly-extending flange of said lower end of said hollow and cylindrically-shaped portion of said internal fitting of said inlet means disposed below said lid; said hollow and cylindrically-shaped portion of said internal fitting of said inlet means snugly engages, and is in fluid communication with, said hollow, cylindrically-shaped, and wide lower portion of said external fitting of said inlet means, with said lid being engaged therebetween.

9. The system as defined in claim 8, wherein said first filtering stage is an empty porous polyester draw bag that is removably secured, by a draw string, around said hollow and cylindrically-shaped portion of said internal fitting of said inlet means and extends vertically downwardly therefrom, with said circumferentially-disposed and radially-outwardly-extending flange of said lower end of said hollow and cylindrically-shaped portion of said internal fitting of said inlet means providing a seal therebetween against leaks, while said draw string of said empty porous polyester draw bag of said first filtering stage allows for quick and easy replacement thereof.

10. The system as defined in claim 9, wherein said empty porous polyester draw bag of said first filtering stage is 4" in diameter, 12" in length, and has a porosity in the range of 100–200 microns when the spent petroleum based hydrocarbon fluid is a cleaning solvent, and has a porosity in the range of 50–100 microns when the spent petroleum based hydrocarbon fluid is a blanket wash.

11. The system as defined in claim 10, wherein said porosity of said empty porous polyester draw bag of said first filtering stage is 200 microns when the spent petroleum based hydrocarbon fluid is a cleaning solvent, and is 50 microns when the spent petroleum based hydrocarbon fluid is a blanket wash.

12. The system as defined in claim 9, wherein said second filtering stage is an empty porous polyester draw bag that encases said empty porous polyester draw bag of said first filtering stage; said empty porous polyester draw bag of said second filtering stage is removably secured, by a draw string, around said hollow and cylindrically-shaped portion of said internal fitting of said inlet means and extends vertically downwardly therefrom, with said circumferentially-disposed and radially-outwardly-extending flange of said lower end of said hollow and cylindrically-shaped portion of said internal fitting of said inlet means providing a seal therebetween against leaks, while said draw string of said empty porous polyester draw bag of said second filtering stage allows for quick and easy replacement thereof.

13. The system as defined in claim 12, wherein said empty porous polyester draw bag of said second filtering stage is 6" in diameter, 18" in length, and has a porosity in the range of 1–100 microns when the spent petroleum based hydrocarbon fluid is a cleaning solvent, and has a porosity in the range of 1–50 microns when the spent petroleum based hydrocarbon fluid is a blanket wash.

14. The system as defined in claim 13, wherein said porosity of said empty porous polyester draw bag of said second filtering stage is 100 microns when the spent petroleum based hydrocarbon fluid is a cleaning solvent, and is 5 microns when the spent petroleum based hydrocarbon fluid is a blanket wash.

15. The system as defined in claim 1; further comprising a hollow canister that contains said third filtering stage and said fourth filtering stage; said hollow canister being disposed in said hollow and open-top fluid reservoir in tandem to said first filtering stage and said second filtering stage and having a circular-cylindrically-shaped top cap with a circular-shaped closed top that has an outer surface an inner surface with a center; said circular-cylindrically-shaped top cap of said hollow canister further having an open bottom, and a hollow and cylindrically-shaped side with a throughbore extending horizontally therethrough.

16. The system as defined in claim 15, wherein said circular-cylindrically-shaped top cap of said hollow canister further has a pair of spaced-apart and threaded canister mounting rods that have vertical axes and extend vertically upwardly from said outer surface of said circular-shaped closed top of said circular-cylindrically-shaped top cap of said hollow canister, from a diameter thereof; said pair of spaced-apart and threaded canister mounting rods of said diameter of said outer surface of said circular-shaped closed top of said circular-cylindrically-shaped top cap of said hollow canister pass through said pair of spaced-apart canister mounting throughbores in said lid and threadably engage canister mounting nuts, with said outer surface of said circular-shaped closed top of said circular-cylindrically-shaped top cap of said hollow canister abutting against said inner surface of said lid.

17. The system as defined in claim 16, wherein said circular-cylindrically-shaped top cap of said hollow canister further has a hollow and cylindrically-shaped portion that extends vertically downwardly from said center of said inner surface of said circular-shaped closed top of said circular-cylindrically-shaped top cap of said hollow canister, in a position equidistantly between said vertical axes of said pair of spaced-apart and threaded canister mounting rods of said diameter of said outer surface of said circular-shaped closed top of said circular-cylindrically-shaped top cap of said hollow canister; said hollow and cylindrically-shaped portion of said center of said inner surface of said circular-cylindrically-shaped top cap of said hollow canister has a circumferentially-disposed and radially-outwardly-extending flange that extends circumferentially around, and radially outwardly from, a lower open end thereof; said hollow and cylindrically-shaped portion of said center of said inner surface of said circular-cylindrically-shaped top cap of said hollow canister further has a horizontally-outwardly extending inlet tube that extends horizontally outwardly therefrom and is in fluid communication therewith.

18. The system as defined in claim 17, wherein said connecting means includes a substantially Z-shaped conduit that has a lower end that is connected to, and in fluid communication with, said submersible internal pump, and an upper end that passes through said throughbore in said hollow and cylindrically-shaped side of said circular-cylindrically-shaped top cap of said hollow canister, and is sealingly connected to, and in fluid communication with, said horizontally-outwardly extending inlet tube of said hollow and cylindrically-shaped portion of said center of said inner surface of said closed top of said circular-cylindrically-shaped top cap of said hollow canister, so that said submersible internal pump is in fluid communication with said hollow canister.

19. The system as defined in claim 15, wherein said hollow canister further includes a hollow, open-ended, and circular-cylindrically-shaped body that extends vertically downwardly from, in fluid communication with, and is replaceably sealingly positioned at an upper end thereof in, said open bottom of said circular-cylindrically-shaped top cap of said hollow canister; said hollow, open-ended, and circular-cylindrically-shaped body of said hollow canister encases said third filtering stage and said fourth filtering stage; said hollow canister further includes a circular-cylindrically-shaped bottom cap that has a circular-shaped and substantially closed bottom with a pair of spaced-apart drain throughbores extending vertically therethrough, and a circular-shaped open top that is in fluid communication with, and is replaceably sealingly positioned to, a lower end of said hollow, open-ended, and circular-cylindrically-shaped body of said hollow canister.

20. The system as defined in claim 17, wherein said third filtering stage includes a porous polyester draw bag that is removably secured, by a draw string, around said hollow and cylindrically-shaped portion of said center of said inner surface of said circular-shaped closed top of said circular-cylindrically-shaped top cap of said hollow canister and extends vertically downwardly therefrom, with said circumferentially-disposed and radially-outwardly-extending flange of said open lower end of said hollow and cylindrically-shaped portion of said center of said inner surface of said circular-shaped top of said circular-cylindrically-shaped top cap of said hollow canister providing a seal therebetween against leaks, while said draw string of said porous polyester draw bag of said third filtering stage contained in said hollow canister allows for quick and easy replacement thereof.

21. The system as defined in claim 20, wherein said porous polyester draw bag of said third filtering stage contained in said hollow canister is 4" in diameter, 12" in length, and has a porosity in the range of 100–200 microns when the spent petroleum based hydrocarbon fluid is a cleaning solvent, and has a porosity in the range of 50–100 microns when the spent petroleum based hydrocarbon fluid is a blanket wash.

22. The system as defined in claim 21, wherein said porous polyester draw bag of said third filtering stage is 200 microns when the spent petroleum based hydrocarbon fluid is a cleaning solvent, and is 50 microns when the spent petroleum based hydrocarbon fluid is a blanket wash.

23. The system as defined in claim 20, wherein said porous polyester draw bag of said third filtering stage contains charcoal that adsorbs grease and dirt from the spent petroleum based hydrocarbon fluid passing therethrough.

24. The system as defined in claim 23, wherein said charcoal contained in said porous polyester draw bag of said third filtering stage is F-300 mesh made from real coal and not derivatives of a group consisting of coconut and wood.

25. The system as defined in claim 23; further comprising a nylon filter disposed over said lower open end of said hollow and cylindrically-shaped portion of said center of said inner surface of said circular-cylindrically-shaped top cap of said hollow canister, so that a barrier for said charcoal contained in said porous polyester draw bag of said third filtering stage contained in said hollow canister is provided since fluid seeks its own level and when said submersible internal pump is inoperative the spent petroleum based hydrocarbon fluid will return back down through said connecting means and have a tendency to carry with it particles of said charcoal contained in said porous polyester draw bag of said third filtering stage contained in said hollow canister.

26. The system as defined in claim 20, wherein said fourth filtering stage includes a porous polyester draw bag that is contained in the hollow canister and encases said third porous polyester draw bag of said third filtering stage contained in said hollow canister; said porous polyester draw bag of said fourth filtering stage is removably secured, by a draw string, around said hollow and cylindrically-shaped portion of said center of said inner surface of said circular-cylindrically-shaped top cap of said hollow canister and extends vertically downwardly therefrom, with said circumferentially-disposed and radially-outwardly-extending flange of said lower open end of said hollow and cylindrically-shaped portion of said inner surface of said circular-shaped closed top of said circular-cylindrically-shaped top cap of said hollow canister providing a seal therebetween against leaks, while said draw string of said porous polyester draw bag of said fourth filtering stage contained in said hollow canister allows for quick and easy replacement thereof.

27. The system as defined in claim 26, wherein said empty porous polyester draw bag of said fourth filtering stage is 6" in diameter, 18" in length, and has a porosity in the range of 1–100 microns when the spent petroleum based hydrocarbon fluid is a cleaning solvent, and has a porosity in the range of 1–50 microns when the spent petroleum based hydrocarbon fluid is a blanket wash.

28. The system as defined in claim 27, wherein said porosity of said porous polyester draw bag of said fourth filtering stage is 100 microns when the spent petroleum based hydrocarbon fluid is a cleaning solvent, and is 5 microns when the spent petroleum based hydrocarbon fluid is a blanket wash.

29. The system as defined in claim 26, wherein said porous polyester draw bag of said fourth filtering stage contained in said hollow canister contains fuller's earth that adsorbs discoloration from the spent petroleum based hydrocarbon fluid passing therethrough, since fuller's earth is a decolorizer and a bleaching agent.

30. A method of using an on-site automated closed loop petroleum based hydrocarbon fluid filtration and recycling system, comprising the steps of:
   a) passing a spent petroleum based hydrocarbon fluid into an empty porous polyester draw bag of a first filtering stage of said on-site automated closed loop petroleum based hydrocarbon fluid filtration and recycling system, via an inlet throughport in a lid of said on-site automated closed loop petroleum based hydrocarbon fluid filtration and recycling system, where large particles of dirt and grease are removed from the spent petroleum based hydrocarbon fluid passing therethrough;
   b) passing the spent petroleum based hydrocarbon fluid that previously past through said empty porous polyester draw bag of said first filtering stage into an empty porous polyester draw bag of a second filtering stage of said on-site automated closed loop petroleum based hydrocarbon fluid filtration and recycling system, which encases said empty porous polyester draw bag of said first filtering stage, where small particles of dirt and grease are removed from the spent petroleum based hydrocarbon fluid passing therethrough;
   c) allowing the spent petroleum based hydrocarbon fluid that previously passed through said empty porous polyester draw bag of said second filtering stage to fall downwardly, by gravity, to a lower portion of a hollow and open-top fluid reservoir of said on-site automated closed loop petroleum based hydrocarbon fluid filtration and recycling system;
   d) drawing in the spent petroleum based hydrocarbon fluid at said lower portion of said hollow and open-top fluid reservoir into a submersible internal pump;
   e) pumping the spent petroleum based hydrocarbon fluid upwardly through a substantially Z-shaped internal conduit of said on-site automated closed loop petroleum based hydrocarbon fluid filtration and recycling system;
   f) passing the spent petroleum based hydrocarbon fluid through a hollow and cylindrically-shaped portion of a circular-cylindrically-shaped top cap of a hollow canister of said on-site automated closed loop petroleum based hydrocarbon fluid filtration and recycling system;
   g) passing the spent petroleum based hydrocarbon fluid that previously passed through the hollow and cylindrically-shaped portion of said circular-cylindrically-shaped top cap of said hollow canister into a porous polyester draw bag of a third filtering stage contained in said hollow canister where charcoal contained in said porous polyester draw bag of said third filtering stage contained in said hollow canister adsorbs grease and dirt from the spent petroleum based hydrocarbon fluid passing therethrough, while said porous polyester draw bag of said third filtering stage contained in said hollow canister eliminates large particles of dirt and grease from the spent petroleum based hydrocarbon fluid passing therethrough;
   h) passing the spent petroleum based hydrocarbon fluid that previously passed through said porous polyester draw bag of said third filtering stage through a porous polyester draw bag of a fourth filtering stage where fuller's earth contained in said porous polyester draw bag of said fourth filtering stage contained in said hollow canister adsorbs discoloration from the spent petroleum based hydrocarbon fluid passing therethrough, while said porous polyester draw bag of said fourth filtering stage contained in said hollow canister eliminates small particles of dirt and grease from the spent petroleum based hydrocarbon fluid passing therethrough;
   i) passing downwardly, by gravity, the recycled petroleum based hydrocarbon fluid that previously passed through said porous polyester draw bag of said fourth filtering stage through a pair of spaced-apart drain throughbores in a circular-shaped and substantially closed bottom of a circular-cylindrically-shaped bottom cap of said hollow canister to said lower portion of said hollow and open-top fluid reservoir;
   j) repeating steps d)–i) for a time duration controlled by an external timer of said on-site automated closed loop petroleum based hydrocarbon fluid filtration and recycling system; and
   k) pumping concurrently with step j) the recycled petroleum based hydrocarbon fluid, by an external pump, up through a conduit to a device from which the spent petroleum based hydrocarbon fluid has been recycled for reuse, so that the recycled petroleum based hydrocarbon fluid is dispensed while the spent petroleum based hydrocarbon fluid is simultaneously recycled.

31. A method of automatically recycling a spent petroleum based hydrocarbon fluid on-site and simultaneously continuously dispensing on-site a recycled petroleum based hydrocarbon fluid that is the spent petroleum based hydrocarbon after being recycled, comprising the step of passing the spent petroleum based hydrocarbon fluid through an on-site automated closed loop petroleum based hydrocarbon fluid filtration and recycling system which comprises:

a) a hollow and open-top fluid reservoir having a closed bottom with an inner surface, and an open top disposed above said closed bottom of said hollow and open-top fluid reservoir;

b) a lid having an outer surface, an inner surface, an inlet throughport extending vertically therethrough, an output throughport extending vertically therethrough, and selectively opening and closing said open top of said hollow and open-top fluid reservoir, so that internal components housed in said hollow and open-top fluid reservoir can be readily serviced;

c) inlet means for inputting the spent petroleum based hydrocarbon fluid into said hollow and open-top fluid reservoir; said inlet means being disposed in said inlet throughport in said lid;

d) outlet means for outputting the recycled petroleum based hydrocarbon fluid from said hollow and open-top fluid reservoir; said outlet means being disposed in said outlet throughport in said lid;

e) a first filtering stage contained in said hollow and open-top fluid reservoir and being removably attached to said inlet means; said first filtering stage removing large particles of dirt and grease from the spent petroleum based hydrocarbon fluid passing therethrough;

f) a second filtering stage encasing said first filtering stage and being contained in said hollow and open-top fluid reservoir; said second filtering station being removably attached to said inlet means and removing small particles of dirt and grease from the spent petroleum based hydrocarbon fluid passing therethrough;

g) a submersible internal pump having an operating time and being disposed in said hollow and open-top fluid reservoir on said inner surface of said closed bottom of said hollow and open-top fluid reservoir, in proximity to said outlet means; said submersible internal pump drawing in the spent petroleum based hydrocarbon fluid passing through said second filtering stage;

h) a third filtering stage contained in said hollow and open-top fluid reservoir and being tandemly disposed to said first filtering stage and said second filtering stage; said third filtering stage adsorbing grease and dirt from the spent petroleum based hydrocarbon fluid passing therethrough;

i) connecting means for fluidly connecting said submersible internal pump to said third filtering stage and being contained in said hollow and open-top fluid reservoir; said connecting means transporting the spent petroleum based hydrocarbon fluid drawn in by said submersible internal pump to said third filtering stage; and j) a fourth filtering stage encasing said third filtering stage and being contained in said hollow and open-top fluid reservoir; said fourth filtering station removing discoloration from the spent petroleum based hydrocarbon fluid passing therethrough, so that the spent petroleum based hydrocarbon fluid passes downwardly through said first filtering stage and is purged of large particles of dirt and grease, then passes downwardly through said second filtering stage and is purged of small particles of dirt and grease, then is drawn into said submersible internal pump, then is pumped upwardly through said connecting means, then passes downwardly through said third filtering stage and is purged of dirt and grease, then passes downwardly through said fourth filtering stage and is purged of discolorations, then enters into said hollow and open-top fluid reservoir, and then is drawn into said outlet means as the recycled petroleum based hydrocarbon fluid.

* * * * *